(12) United States Patent
Yamaoka

(10) Patent No.: US 10,530,821 B2
(45) Date of Patent: Jan. 7, 2020

(54) DISTRIBUTION AND RECEPTION METHOD, AND SYSTEM

(71) Applicant: FUJITSU LIMITED, Kawasaki-shi, Kanagawa (JP)

(72) Inventor: Hisatoshi Yamaoka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 301 days.

(21) Appl. No.: 15/439,429

(22) Filed: Feb. 22, 2017

(65) Prior Publication Data
US 2017/0251036 A1 Aug. 31, 2017

(30) Foreign Application Priority Data

Feb. 26, 2016 (JP) ................................. 2016-036345

(51) Int. Cl.
*H04L 29/06* (2006.01)
*H04L 12/26* (2006.01)
*H04L 29/08* (2006.01)

(52) U.S. Cl.
CPC .......... *H04L 65/4076* (2013.01); *H04L 43/16* (2013.01); *H04L 67/26* (2013.01)

(58) Field of Classification Search
CPC .... G06F 11/2252; G06F 11/263; G06F 11/27; G06F 11/2733; G06F 11/277; G06F 11/30; G06F 11/3006; G06F 11/3409; G06F 11/3447; G06F 11/36; G06F 11/3684; G06F 17/40; G06F 21/6254; G06F 2221/2107; G06F 16/137; G06F 16/93; G06F 19/30; G06F 21/10; G06F 21/445; G06F 21/602;
(Continued)

(56) References Cited

U.S. PATENT DOCUMENTS

| 2013/0124634 | A1* | 5/2013 | Weinstein | H04L 51/06 709/204 |
| 2014/0013102 | A1* | 1/2014 | Dottax | H04L 9/302 713/150 |
| 2014/0078183 | A1* | 3/2014 | Watson | G06T 3/40 345/667 |

FOREIGN PATENT DOCUMENTS

| JP | 9-64086 | 3/1997 |
| JP | 2000-4484 | 1/2000 |
| JP | 2003-23670 | 1/2003 |

(Continued)

OTHER PUBLICATIONS

Japanese Office Action dated Jun. 4, 2019, issued in corresponding Japanese Patent Application No. 2016-036345.
(Continued)

*Primary Examiner* — Djenane M Bayard
(74) *Attorney, Agent, or Firm* — Xsensus LLP

(57) ABSTRACT

A system includes a server including first circuitry and a plurality of terminals, each of which includes second circuitry respectively. The first circuitry is configured to store primes assigned to the plurality of terminals, acquire two or more primes assigned to two or more terminals that and are destinations of contents, calculate a first product of the two or more primes, and transmit first notification data including the first product and the contents to the plurality of terminals. The second circuitry is configured to store an assigned prime, receive the first notification data, determine whether the first product included in the first notification data is divisible by the assigned prime, and acquire, from the first notification data, the contents included in the first notification data based on a result of a determination.

20 Claims, 29 Drawing Sheets

(58) Field of Classification Search
CPC ......... G06F 21/6281; G06F 2221/2141; G06F 9/468
See application file for complete search history.

(56) References Cited

FOREIGN PATENT DOCUMENTS

| | | |
|---|---|---|
| JP | 2009-225430 | 10/2009 |
| KR | 10-2006-0067493 | 6/2006 |
| KR | 10-2006-0067493 A | 6/2006 |

OTHER PUBLICATIONS

Decision of Refusal issue in Japanese Application 2016-036345 dated Jul. 30, 2019.

* cited by examiner

FIG. 4

| TERMINAL ID | PRIME |
|---|---|
| Ta | Pa |
| Tb | Pb |
| Tc | Pc |
| Td | Pd |
| ⋮ | ⋮ |

FIG. 25

| TERMINAL ID | PRIME | INTERFACE ID |
|---|---|---|
| Ta | Pa | F1 |
| Tb | Pb | F1 |
| Tc | Pc | F2 |
| Td | Pd | F2 |
| ⋮ | ⋮ | ⋮ |

DISTRIBUTION AND RECEPTION METHOD, AND SYSTEM

CROSS-REFERENCE TO RELATED APPLICATION

This application is based upon and claims the benefit of priority of the prior Japanese Patent Application No. 2016-036345, filed on Feb. 26, 2016, the entire contents of which are incorporated herein by reference.

FIELD

The embodiments discussed herein are related to a notification technique by a broadcasting scheme.

BACKGROUND

Representative examples of notification by push communication from an application server to a mobile terminal are the reception mail and the upgrade of the version of a program. However, notification of various types is executed based on the purposes of applications in some cases.

For example, if a notification is transmitted to a plurality of arbitrary destinations set in the notification by a broadcasting scheme using a Bluetooth Low Energy (BLE, Bluetooth is a registered trademark) beacon, the broadcasting scheme has an advantage in that power to be consumed is suppressed, compared with a case where notifications are separately transmitted by a cellular scheme or a wireless area network (LAN) scheme.

Related techniques are disclosed in, for example, Japanese Laid-open Patent Publication Nos. 9-84086, 2000-4484, 2003-23670, and 2009-225430.

SUMMARY

According to an aspect of the invention, a system includes a server including first circuitry and a plurality of terminals, each of which includes second circuitry respectively. The first circuitry is configured to store primes assigned to the plurality of terminals, acquire two or more primes, from among the primes, assigned to two or more terminals that are among the plurality of terminals and are destinations of contents, calculate a first product of the two or more primes, and transmit first notification data including the first product and the contents to the plurality of terminals. The second circuitry is configured to store an assigned prime, receive the first notification data, determine whether or not the first product included in the first notification data is divisible by the assigned prime, and acquire, from the first notification data, the contents included in the first notification data based on a result of a determination regarding whether or not the first product included in the first notification data is divisible by the assigned prime.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of the configuration of a terminal table;

FIG. 25 is a diagram illustrating an example of the configuration of a terminal table according to the fifth embodiment;

DESCRIPTION OF EMBODIMENTS

If a broadcasting scheme is used, there is a risk that a destination of a notification may become known to other persons.

According to an aspect, an object of the present disclosure is to make it difficult for destinations of mass notification by the broadcasting scheme to be predicted.

First Embodiment

A first embodiment assumes that a notification (for example, a notification to lottery winners) is transmitted to radio terminals held by a part (for example, the lottery winners) of participants gathering in a venue (for example, a lottery venue).

Figure 1:
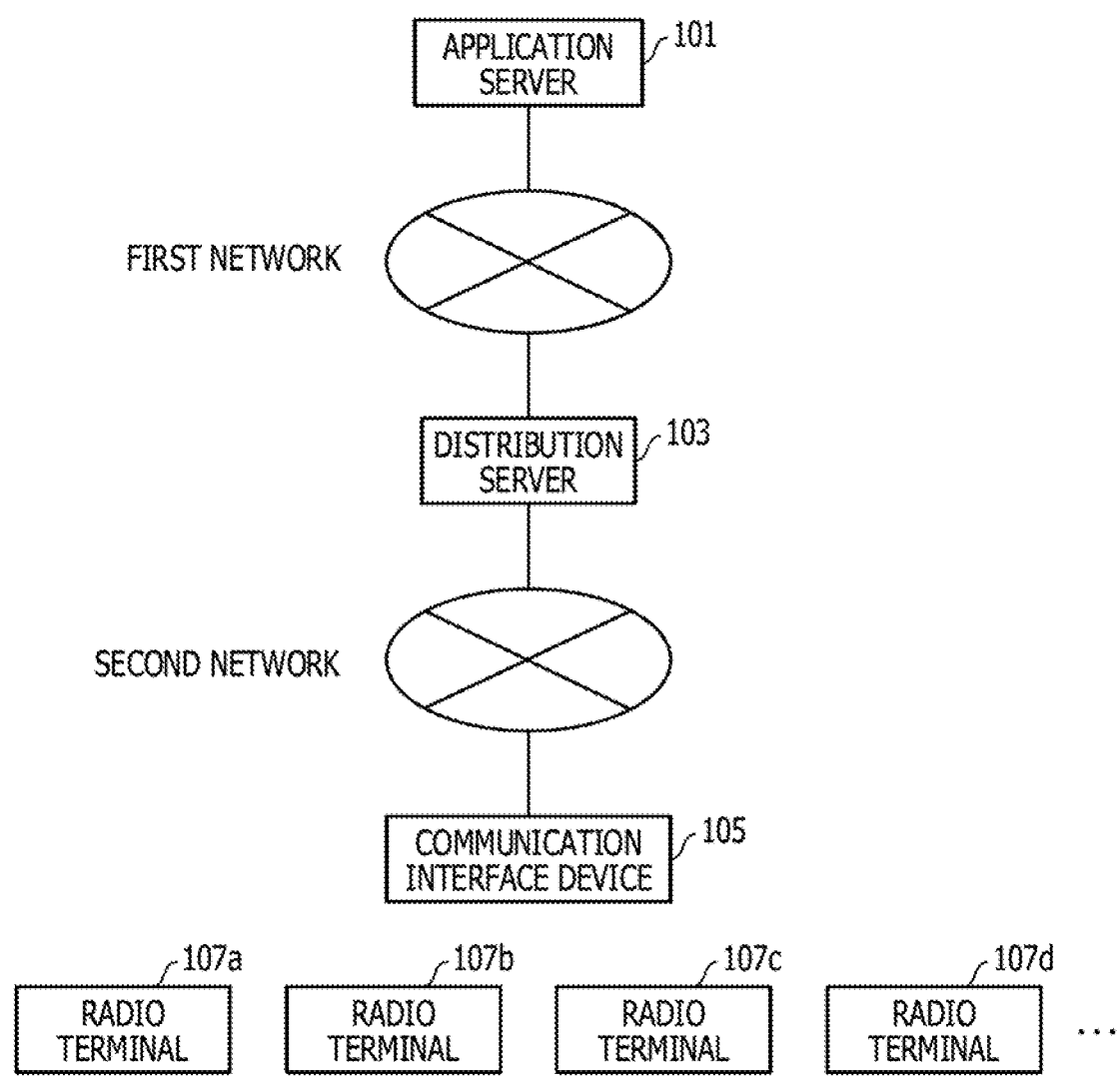
FIG. 1 is a diagram illustrating an example of a network configuration.

FIG. 1 illustrates an example of a network configuration. An application server 101 and a distribution server 103 are connected to each other via a first network. The first network is, for example, the Internet or a LAN.

The application server 101 holds IDs of radio terminals 107 held by participants. The application server 101 generates a notification to be transmitted to a part of the radio terminals 107. The application server 101 requests the distribution server 103 to transmit a notification to the part of the radio terminals 107 via the first network.

The distribution server 103 is connected to a communication interface device 105 via a second network. The second network is, for example, the Internet or a LAN. The second network and the first network may be common. The distribution server 103 may be integrated with the application server 101.

The communication interface device 105 executes broadcasting to the radio terminals 107. The communication interface device 105 is a BLE beacon, for example. Communication by the BLE beacon is referred to as advertising communication in some cases. The broadcasting is a method to transmit notification to a large unspecified number of radio terminals at once without designating address. This means the broadcasting is not a method to transmit the notification to specific radio terminals which are designated by address. The broadcasting may be executed by a scheme other than a near-field communication scheme. For example, the broadcasting may be executed by a visible light communication scheme or an ultrasonic communication scheme.

When receiving a notification request from the application server 101, the distribution server 103 generates a notification message of which destinations are radio terminals 107 specified in the notification request. Then, the distribution server 103 broadcasts the notification message via the communication interface device 105.

The first embodiment makes it difficult for other persons to predict the destinations set in the notification message broadcasted in the aforementioned manner.

Figure 2:
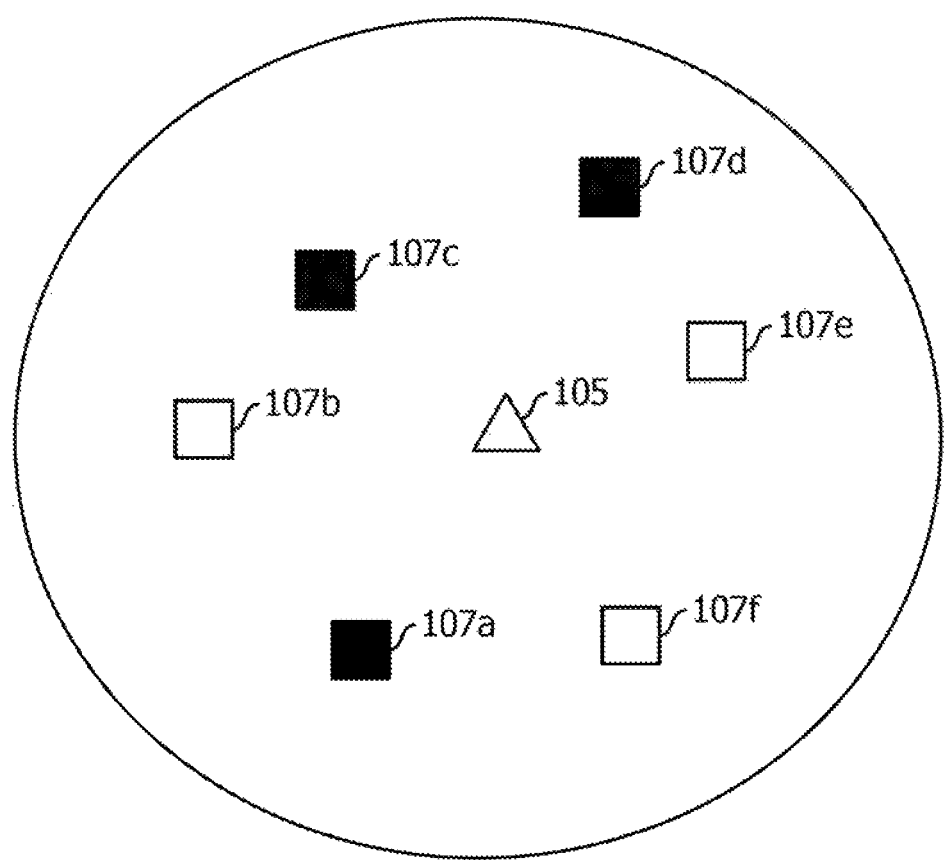
FIG. 2 is a diagram illustrating an example of the arrangement of radio terminals.

FIG. 2 illustrates an example of the arrangement of the radio terminals 107. A circle illustrated in FIG. 2 indicates a range of radio communication by the communication interface device 105. Specifically, radio terminals 107a to 107f are located in the range where the radio terminals 107a to 107f receive a radio wave from the communication interface device 105.

In this example, radio terminals 107 that correspond to destinations specified by the application server 101 are illustrated in black. As illustrated in FIG. 2, the radio terminals 107a, 107c, and 107d correspond to the destinations. The other radio terminals 107 that do not correspond to the destinations are illustrated in white. As illustrated in FIG. 2, the radio terminals 107b, 107e, and 107f do not correspond to the destinations. In this example, the six radio terminals 107 are illustrated, but a larger number of radio terminals 107 may be located in the range of the radio communication.

Unique primes are assigned to the radio terminals 107, respectively. It is assumed that the primes are already registered in the distribution server 103. The radio terminals 107 store the primes assigned to the radio terminals 107, respectively.

Figure 3:
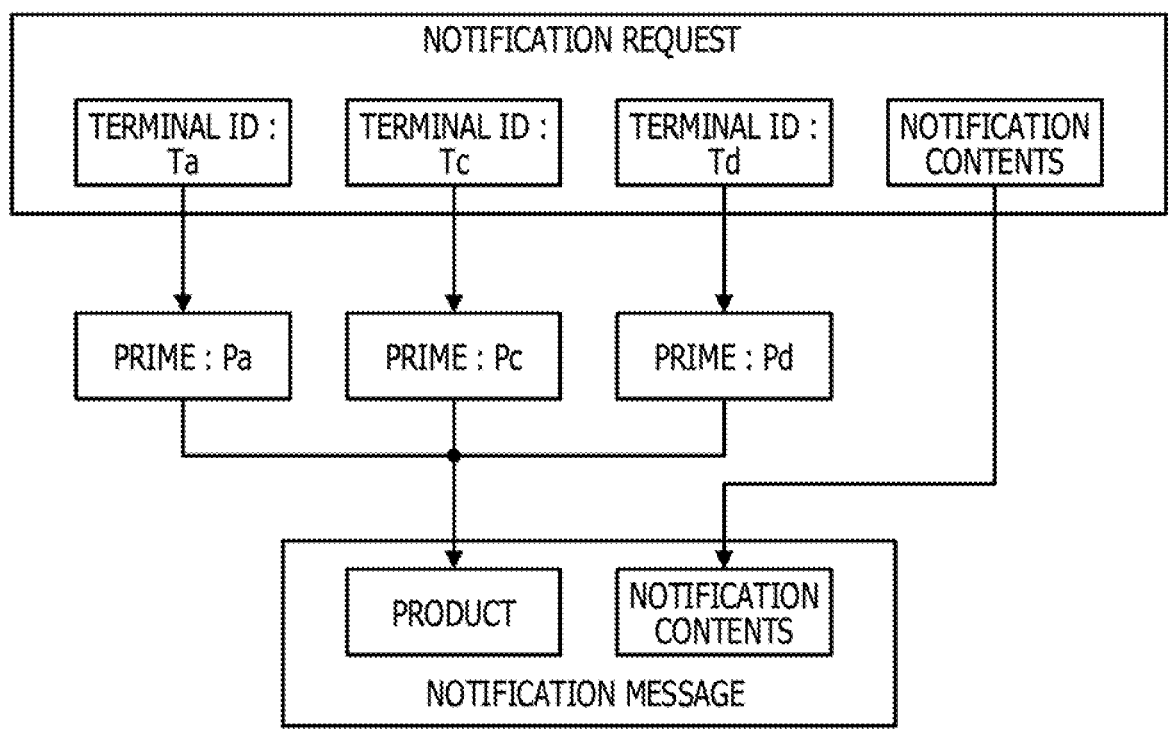
FIG. 3 is a diagram illustrating the outline of a notification message.

FIG. 3 illustrates the outline of the notification message. Terminal IDs that indicate the destinations are set in the notification request transmitted by the application server 101. In this example, the terminal IDs "Ta", "Tc", and "Td" are set in the notification request. In addition, notification contents that are to be transmitted to the destination radio terminals 107 are set in the notification request. The notification contents are arbitrary. The notification contents may be characters to be displayed on the radio terminals 107, an image to be displayed on the radio terminals 107, or a URL that indicates a storage destination of the notification contents.

The distribution server 103 calculates a product of a prime "Pa" assigned to the terminal ID "Ta", a prime "Pc" assigned to the terminal ID "Tc", and a prime "Pd" assigned to the terminal ID "Td". Then, the calculated product is set in the notification message. The notification contents are also set in the notification message.

Figure 4:
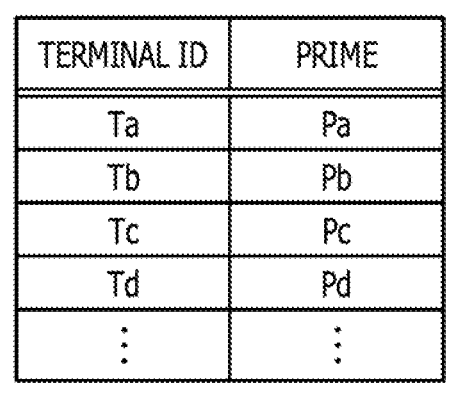

FIG. 4 illustrates an example of the configuration of a terminal table held in the distribution server 103. The terminal table of this example includes records (hereinafter referred to as terminal records) for the terminals. The terminal records include fields in which terminal IDs are set and fields in which primes are set. The terminal IDs are the IDs of the radio terminals 107 to which the primes are assigned. The primes are assigned to the radio terminals 107, respectively.

The first terminal record illustrated in FIG. 4 indicates that the prime "Pa" is assigned to the radio terminal 107a identified by the ID "Ta". The second terminal record indicates that the prime "Pb" is assigned to the radio terminal 107b identified by the ID "Tb". The third terminal record indicates that the prime "Pc" is assigned to the radio terminal 107c identified by the ID "Tc". The fourth terminal record indicates that the prime "Pd" is assigned to the radio terminal 107d identified by the ID "Td".

Next, sequences are described. The sequences in a registration phase and a distribution phase are described below. In the registration phase, the primes assigned to the radio terminals 107 are registered in the distribution server 103.

Figure 5:
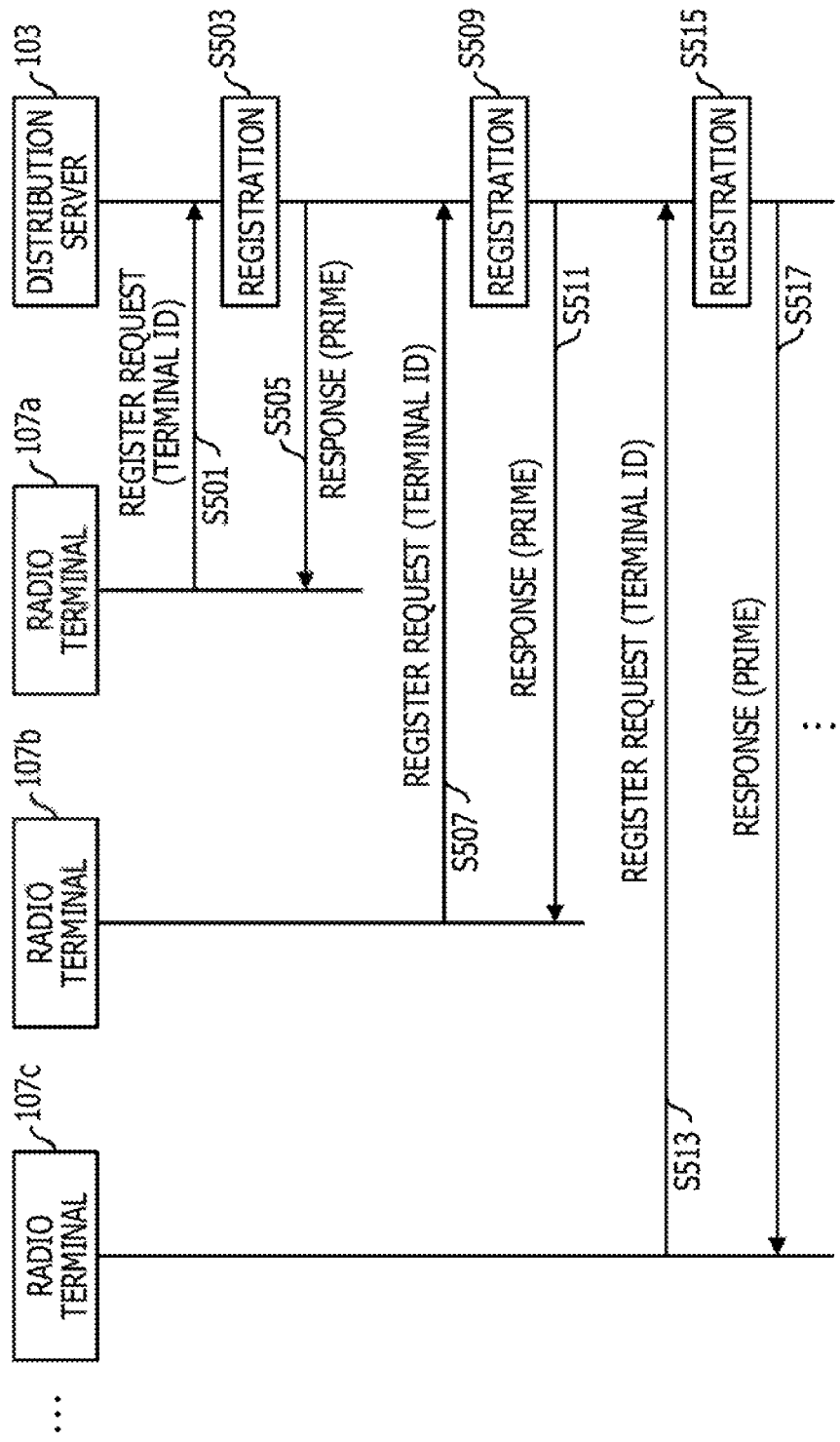
FIG. 5 is a diagram illustrating an example of a sequence in a registration phase.

FIG. 5 illustrates an example of the sequence in the registration phase. The radio terminal 107a transmits a register request to the distribution server 103 (in S501). The register request includes the terminal ID of the radio terminal 107a. For example, the radio terminals 107 transmit register request by a wireless LAN scheme or the near-field communication scheme.

When receiving the register request, the distribution server 103 assigns a prime to the radio terminal 107a that is a source of the register request. Then, the distribution server 103 associates the prime with the ID of the radio terminal 107a and registers the prime and the ID of the radio terminal 107a in the terminal table (in S503).

The distribution server 103 returns, to the radio terminal 107a, a response including the prime assigned to the radio terminal 107a (in S505). The distribution server 103 transmits the response by a cellular scheme, the wireless LAN scheme, or the near-field communication scheme, for example. The radio terminal 107a stores the prime assigned to the radio terminal 107a.

Similarly, the radio terminal 107b transmits a register request to the distribution server 103 (in S507). The register request includes the terminal ID of the radio terminal 107b.

When receiving the register request, the distribution server 103 assigns a prime to the radio terminal 107b that is a source of the register request. The prime assigned to the radio terminal 107b does not duplicate the prime assigned to the radio terminal 107a. Then, the distribution server 103 associates the prime with the ID of the radio terminal 107b and registers the prime and the ID of the radio terminal 107b in the terminal table (in S509).

The distribution server 103 returns, to the radio terminal 107b, a response including the prime assigned to the radio terminal 107b (in S511). The radio terminal 107b stores the prime assigned to the radio terminal 107b.

Similarly, the radio terminal 107c transmits a register request to the distribution server 103 (in S513). The register request includes the terminal ID of the radio terminal 107c.

When receiving the register request, the distribution server 103 assigns a prime to the radio terminal 107c that is a source of the register request. The prime assigned to the radio terminal 107c does not duplicate the prime assigned to the radio terminal 107a and the prime assigned to the radio terminal 107b. Then, the distribution server 103 associates the prime with the ID of the radio terminal 107c and registers the prime and the ID of the radio terminal 107c in the terminal table (in S515).

The distribution server 103 returns, to the radio terminal 107c, a response including the prime assigned to the radio terminal 107c (in S517). The radio terminal 107c stores the prime assigned to the radio terminal 107c. A description of the radio terminals 107d to 107f is omitted. In this manner, the primes assigned to the radio terminals 107 are registered in the terminal table.

Although FIG. 5 indicates the example in which the distribution server 103 determines the primes, the radio terminals 107 may determine candidates for the primes. In this case, the radio terminals 107 transmit tentatively determined primes to the distribution server 103, and the distribution server 103 determines whether or not the primes duplicate other registered primes. If the primes do not duplicate the other registered primes, the primes are treated as being formally assigned to the radio terminals 107. If the primes duplicate the other registered primes the radio terminals 107 determine candidates for the primes again, and the same procedure as described above is repeated.

Figure 6:
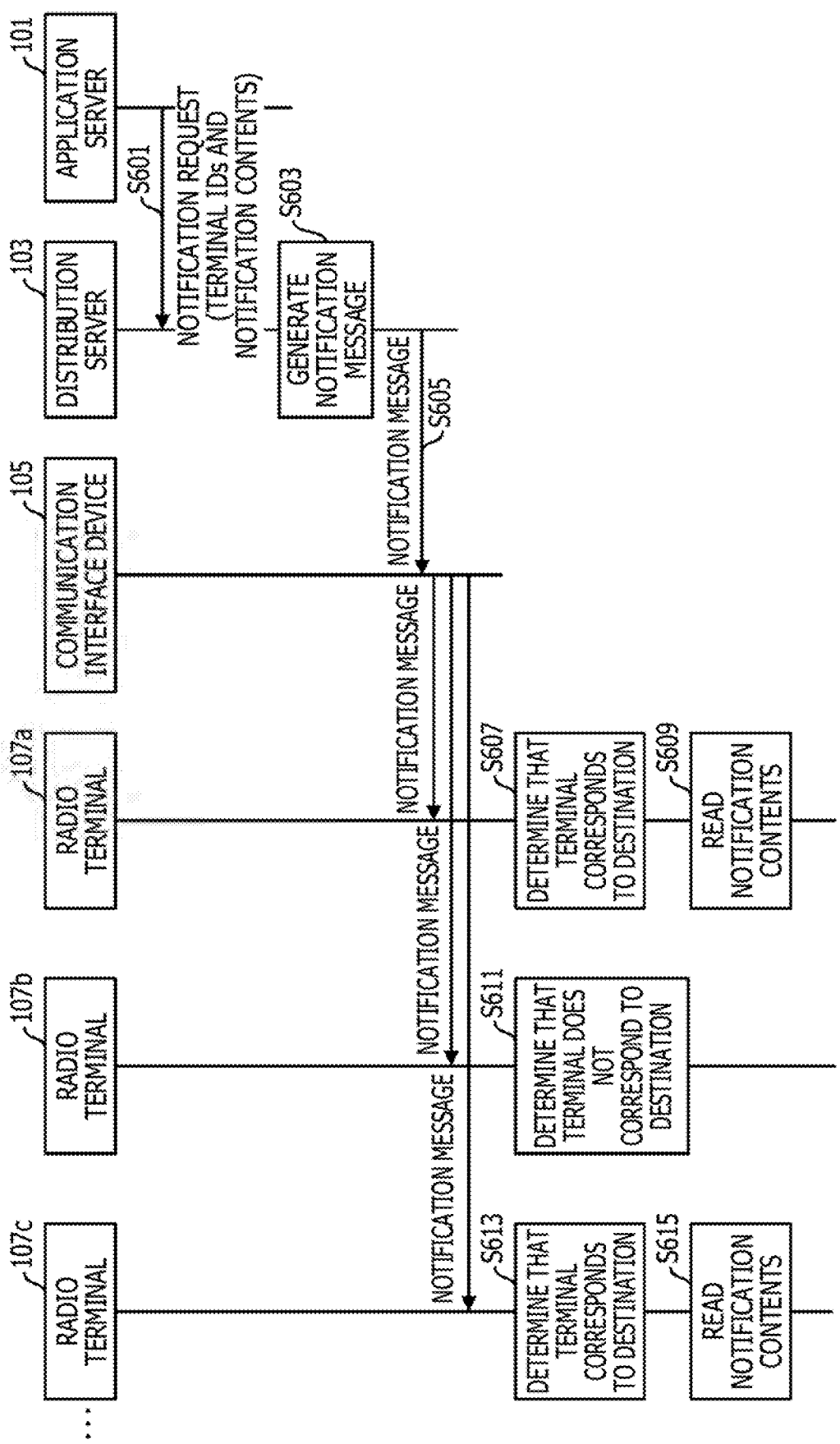
FIG. 6 is a diagram illustrating an example of a sequence in a distribution phase.

Next, the distribution phase is described. In the distribution phase, the distribution server 103 receives a notification request from the application server 101 and distributes a notification to the radio terminals 107. FIG. 6 illustrates an example of the sequence in the distribution phase. The application server 101 transmits a notification request to the distribution server 103 (in S601). The notification request includes terminal IDs of destinations and notification contents, as described above.

When receiving the notification request, the distribution server 103 generates a notification message (in S603). The notification message includes the notification contents and a product that is used to identify the destinations.

The distribution server 103 transmits the notification message to the radio terminals 107a to 107c via the communication interface device 105 (in S605). The distribution server 103 also transmits the notification message to the radio terminals 107d to 107f, although the radio terminals 107d to 107f are not illustrated in FIG. 6. Specifically, the notification message is broadcasted.

The product included in the notification message is divisible by the prime assigned to the radio terminal 107a. Thus, the radio terminal 107a determines that the radio terminal 107a corresponds to a destination (in S607). Then, the radio terminal 107a reads the notification contents included in the notification message (in S609). In addition, the radio terminal 107a may execute a process based on the notification contents.

The product included in the notification message is not divisible by the prime assigned to the radio terminal 107b. Thus, the radio terminal 107b determines that the radio terminal 107b does not correspond to a destination (in S611). Accordingly, the radio terminal 107b does not read the notification contents included in the notification message.

Similarly to the radio terminal 107a, the radio terminal 107c determines that the radio terminal 107c corresponds to a destination (in S613). Then, the radio terminal 107c reads the notification contents included in the notification message (in S615). In addition, the radio terminal 107c may execute a process based on the notification contents.

The radio terminal 107d executes the same processes as those executed by the radio terminals 107a and 107c. The radio terminals 107e and 107f execute the same processes as those executed by the radio terminal 107b. The description of the outline of the first embodiment is finished.

Figure 7:
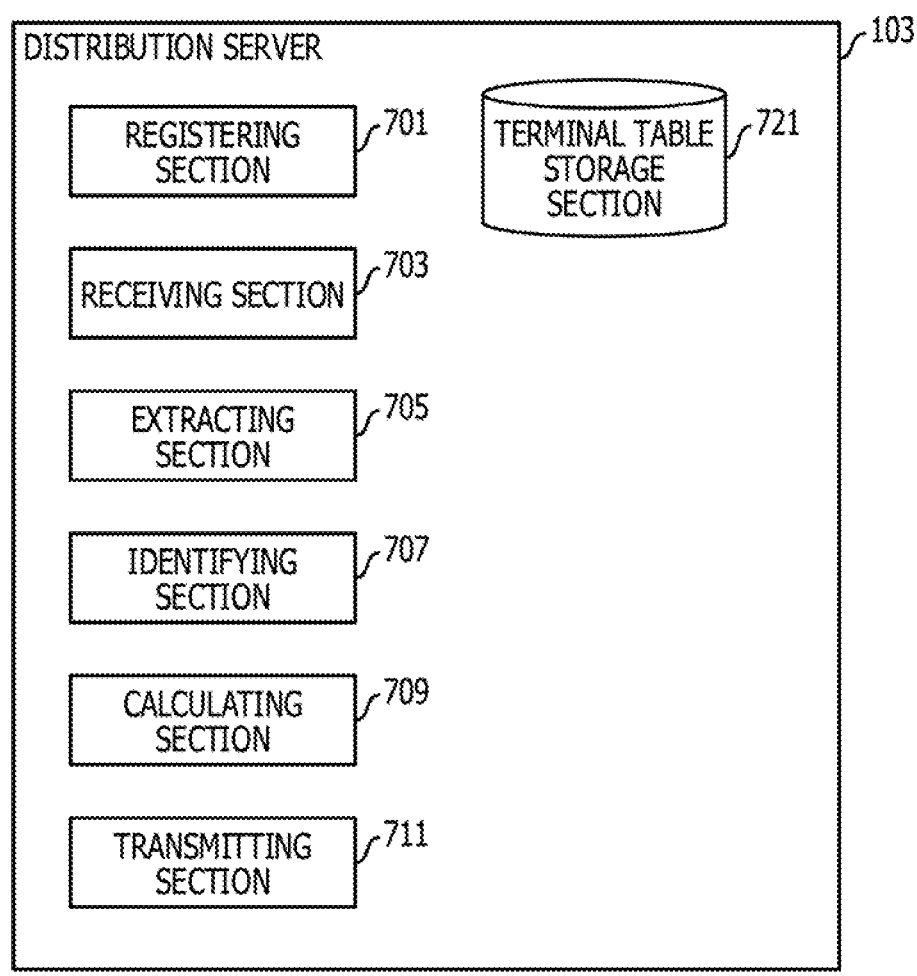
FIG. 7 is a diagram illustrating an example of a module configuration of a distribution server.

FIG. 7 illustrates an example of a module configuration of the distribution server 103. The distribution server 103 includes a registering section 701, a receiving section 703, an extracting section 705, an identifying section 707, a calculating section 709, a transmitting section 711, and a terminal table storage section 721.

The registering section 701 associates terminal IDs with primes and registers the terminal IDs and the primes in the terminal table. The receiving section 703 receives a notification request from the application server 101. The extracting section 705 extracts terminal IDs identifying destination terminals from the notification request. The identifying section 707 identifies primes assigned to the terminal IDs of the destination terminals. The calculating section 709 calculates a product of the primes. The transmitting section 711 transmits a notification message. The terminal table storage section 721 stores the terminal table.

The registering section 701, the receiving section 703, the trading section 705, the identifying section 707, the calculating section 709, and the transmitting section 711 are achieved using hardware resources (illustrated in FIG. 29, for example) and a program that causes a processor to execute processes described later.

Figure 29:
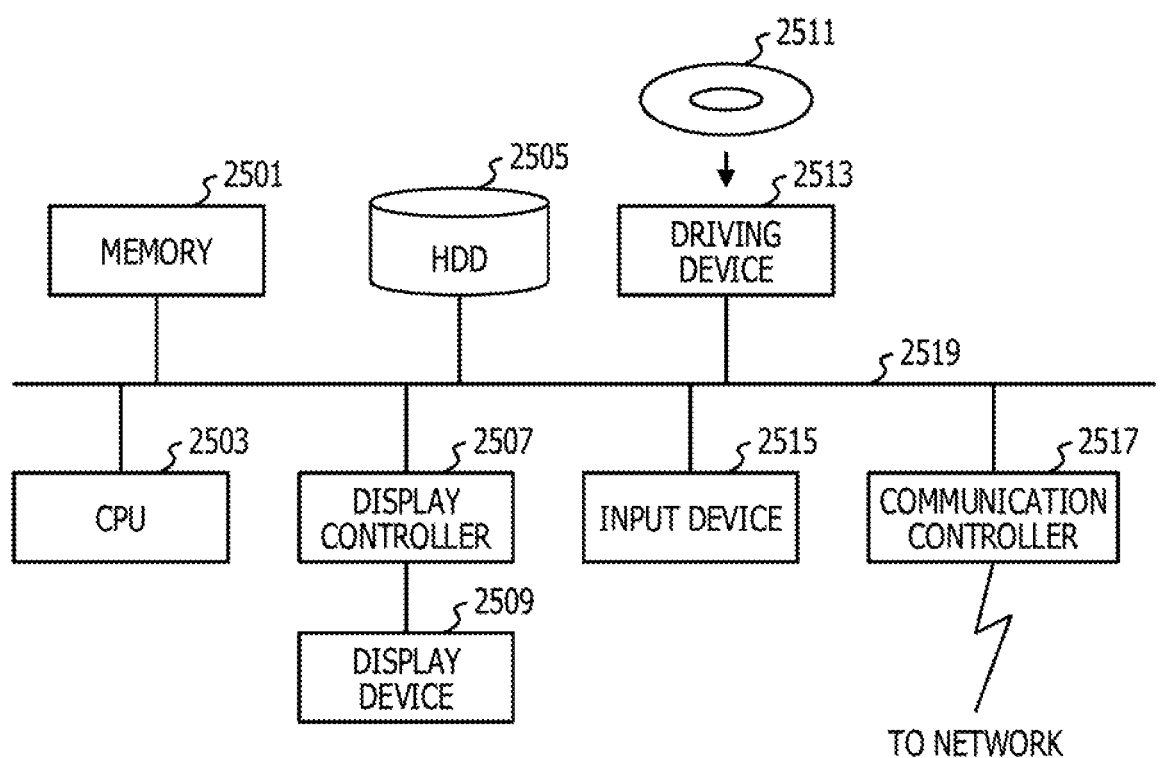
FIG. 29 is a functional block diagram of a computer.

The terminal table storage section 721 is achieved using a hardware resource (illustrated in FIG. 29, for example).

Figure 8:
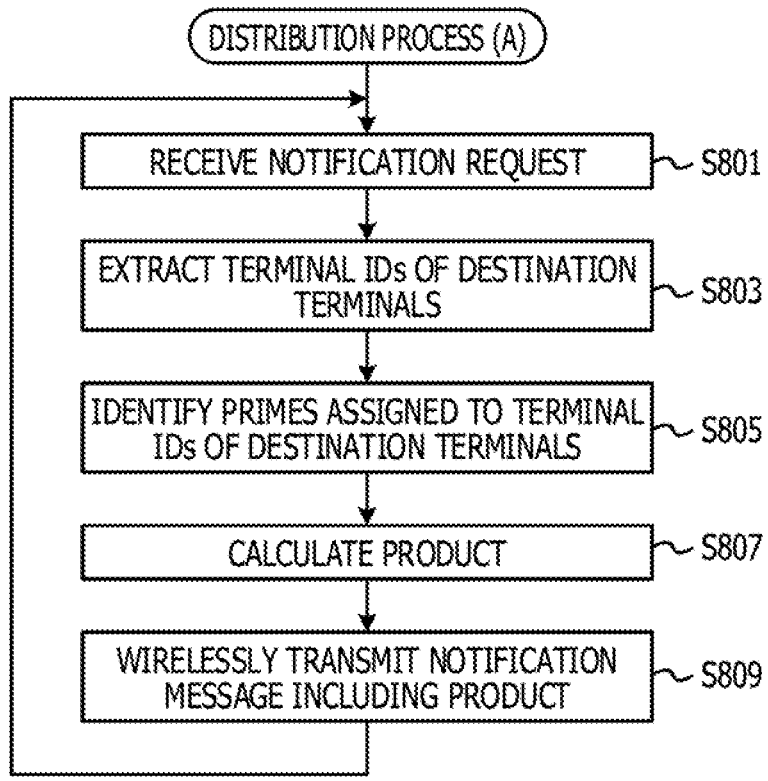
FIG. 8 is a diagram illustrating the flow of a distribution process (A)

A distribution process to be executed by the distribution server 103 is described below. FIG. 8 illustrates the flow of the distribution process (A). The receiving section 703 receives a notification request from the application server 101 (in S801). The extracting section 705 extracts terminal IDs of destination terminals from the notification request (in S803).

The identifying section 707 identifies, based on the terminal table, primes assigned to the terminal IDs of the destination terminals (in S805). The calculating section 709 calculates a product of the identified primes (in S807). The calculating section 709 may execute data compression on the product by a conventional lossless compression scheme to compress the product.

The transmitting section 711 generates a notification message including the product calculated by the calculating section 709 and wirelessly transmits the generated notification message via the communication interface device 105 (in S809). The transmission executed by the transmitting section 711 is based on the broadcasting scheme. As described above, the generated notification message includes notification contents. Then, the distribution process (A) returns to the process indicated by S801, and the aforementioned processes are repeated.

Figure 9:
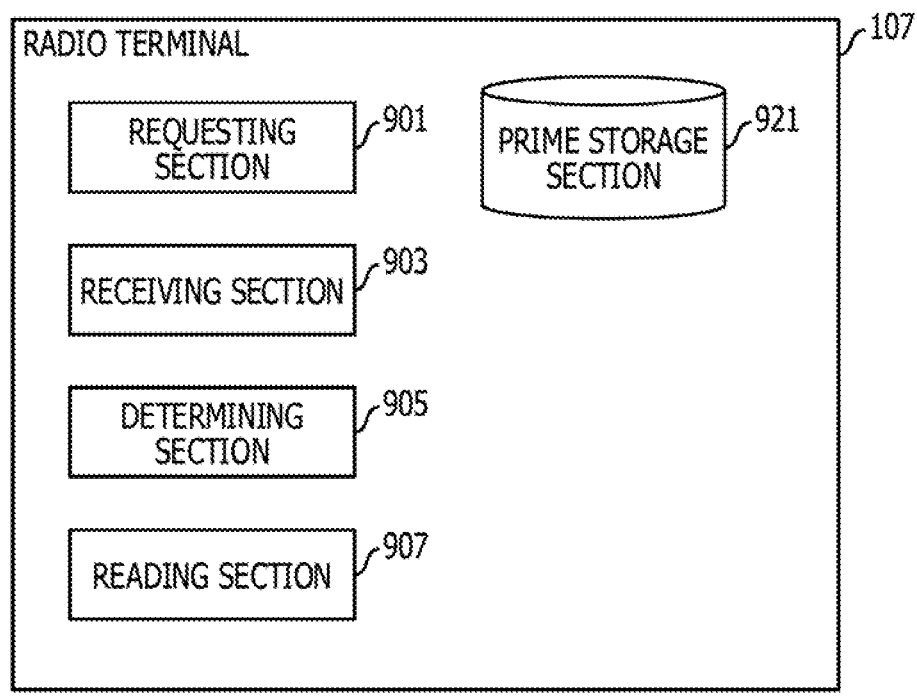
FIG. 9 is a diagram illustrating an example of a module configuration of each of the radio terminals.

FIG. 9 illustrates an example of a module configuration of each of the radio terminals 107. Each of the radio terminals 107 includes a requesting section 901, a receiving section 903, a determining section 905, a reading section 907, and a prime storage section 921.

The requesting section 901 requests the distribution server 103 to register the target radio terminal 107. The receiving section 903 receives a notification message from the communication interface device 105. The determining section 905 determines whether the target radio terminal 107 corresponds to a destination. The reading section 907 reads notification contents included in the notification message. The prime storage section 921 stores a prime assigned to the target radio terminal 107.

The requesting section 901, the receiving section 903, the determining section 905, and the reading section 907 are achieved using hardware resources (illustrated in FIG. 28, for example) and a program that causes a processor to execute processes described later.

Figure 28:
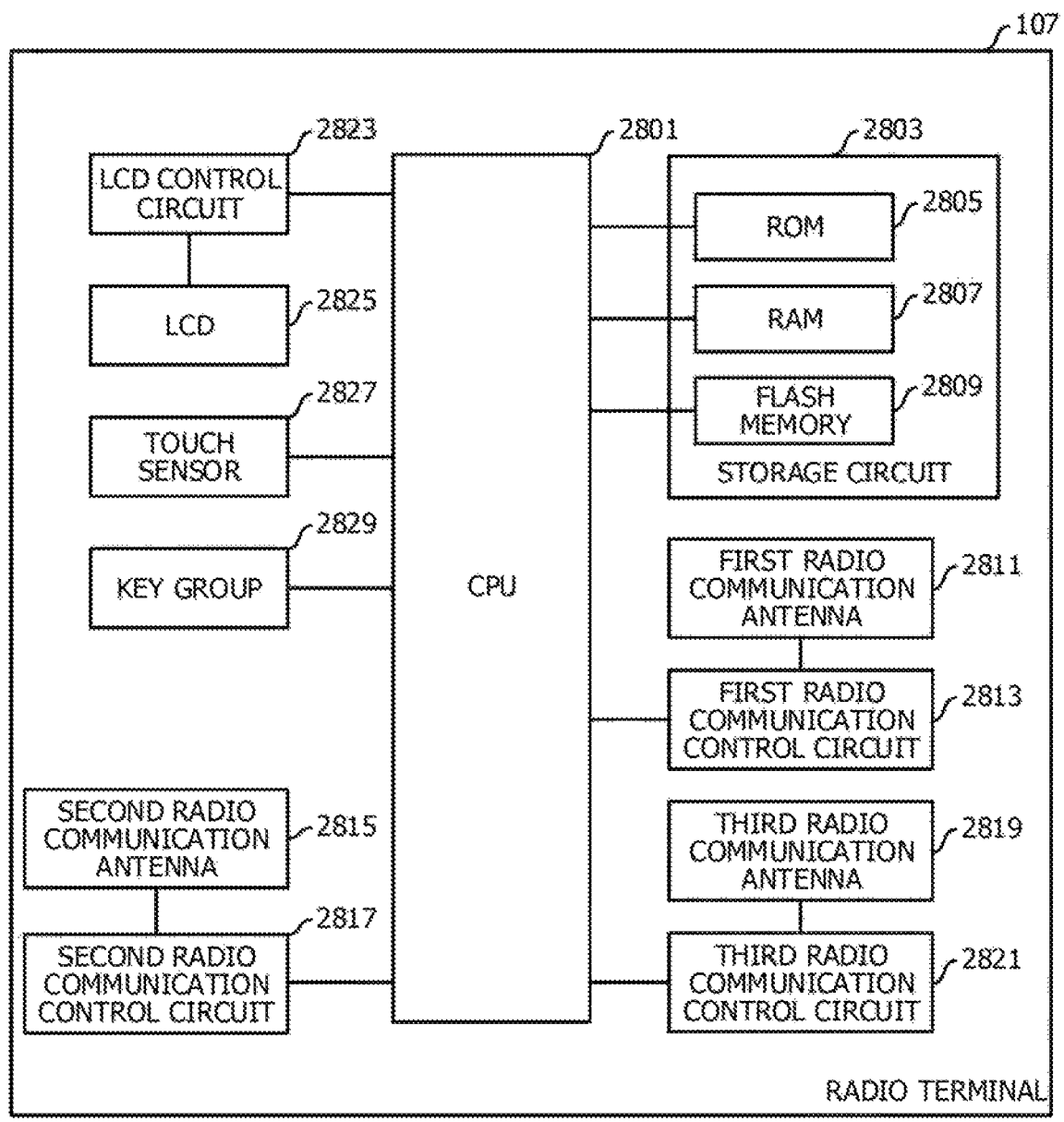
FIG. 28 is a diagram illustrating an example of a hardware configuration of each of the radio terminals.

The prime storage section 921 is achieved using a hardware resource (illustrated in FIG. 28, for example).

Figure 10:
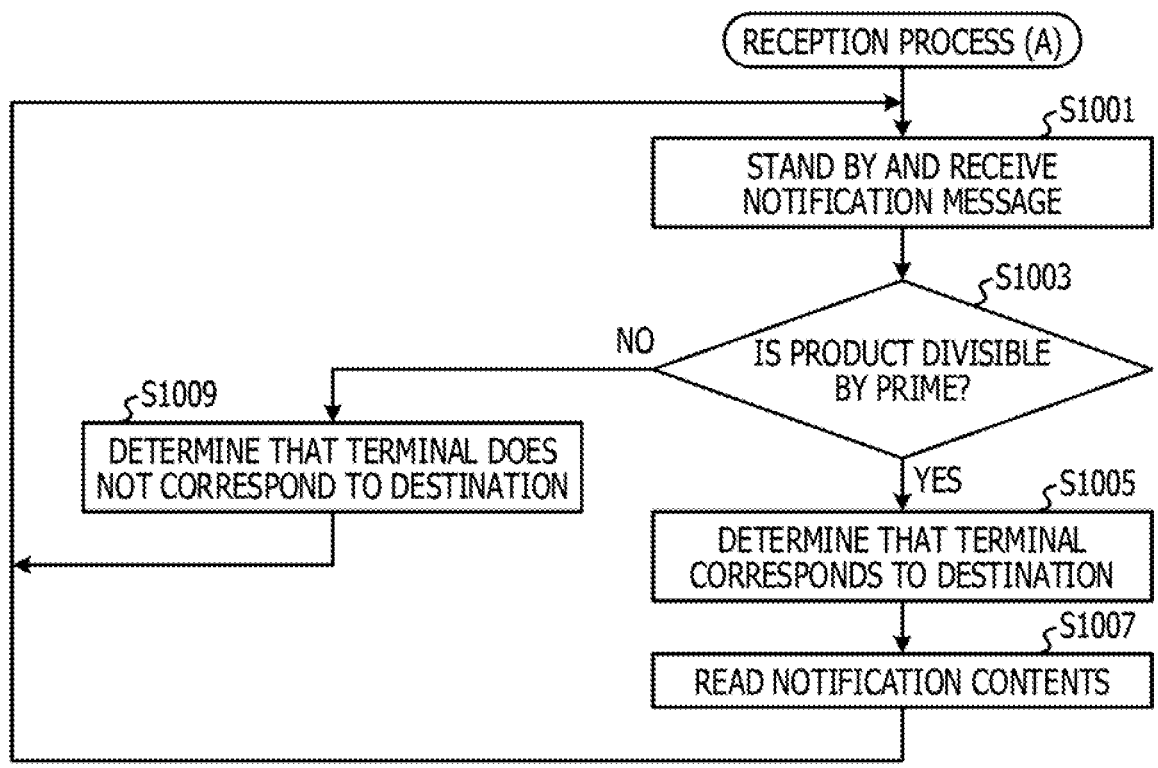
FIG. 10 is a diagram illustrating the flow of a reception process (A)

A reception process to be executed by the radio terminal 107 described. FIG. 10 illustrates the flow of the reception process (A). The receiving section 903 stands by and receives a notification message via the communication interface device 105 (in S1001). The determining section 905 whether or not a product set in the received notification message is divisible by the prime assigned to the target radio terminal 107 (in S1003). If the product is compressed, the determining section 905 may decompress the product in S1003.

If the product is divisible by the prime, the determining section 905 determines that the target radio terminal 107 corresponds to a destination (in S1005). Then, the reading section 907 reads notification contents included in the notification message (in S1007). After that, the radio terminal 107 may execute a process based on the notification contents. In this example, the reception process (A) returns to the process indicated by S1001, and the mentioned processes are repeated.

On the other hand, if the product is not divisible by the prime, the determining section 905 determines that the target radio terminal 107 does not correspond to the destination (in S1009). Then, the reception process (A) returns to the process indicated by S1001, and the aforementioned processes are repeated.

According to the first embodiment, it is difficult to predict destinations of mass notification by the broadcasting scheme. In addition, it is difficult to predict the number of the destinations.

Second Embodiment

In a second embodiment, if a ratio of the number of radio terminals corresponding to destinations is high, a product of primes assigned to radio terminals that do not correspond to the destinations is used.

Figure 11:
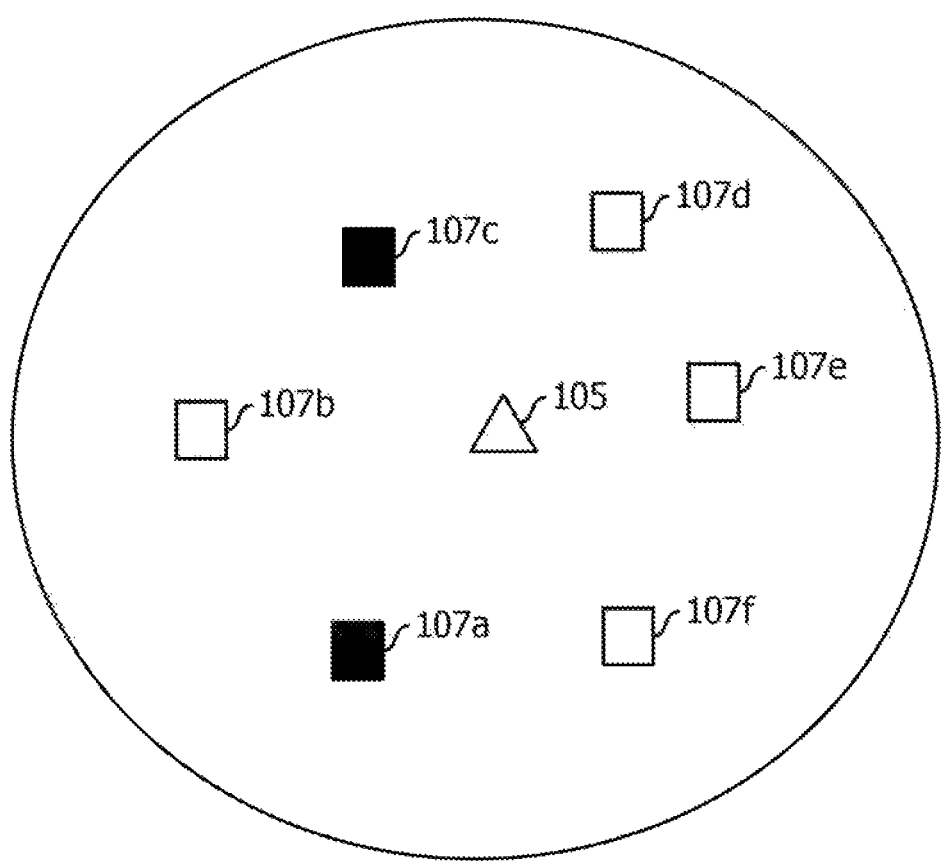
FIG. 11 is a diagram illustrating an example of the arrangement of the radio terminals.

FIG. 11 illustrates an example of the arrangement of a small number of destination terminals. In this example, the radio terminals 107a and 107c correspond to destinations, while the radio terminals 107b, 107d, 107e, and 107f do not correspond to the destinations. Specifically, the number of the radio terminals 107 corresponding to the destinations is smaller than the number of the radio terminals 107 that do not correspond to the destinations. In this case, if the radio terminals 107 that correspond to the destinations are identified, a product of primes assigned to the radio terminals 107 corresponding to the destinations is smaller. In the example illustrated in FIG. 11, the radio terminals 107 that correspond to the destinations are identified in a normal mode.

Figure 12:
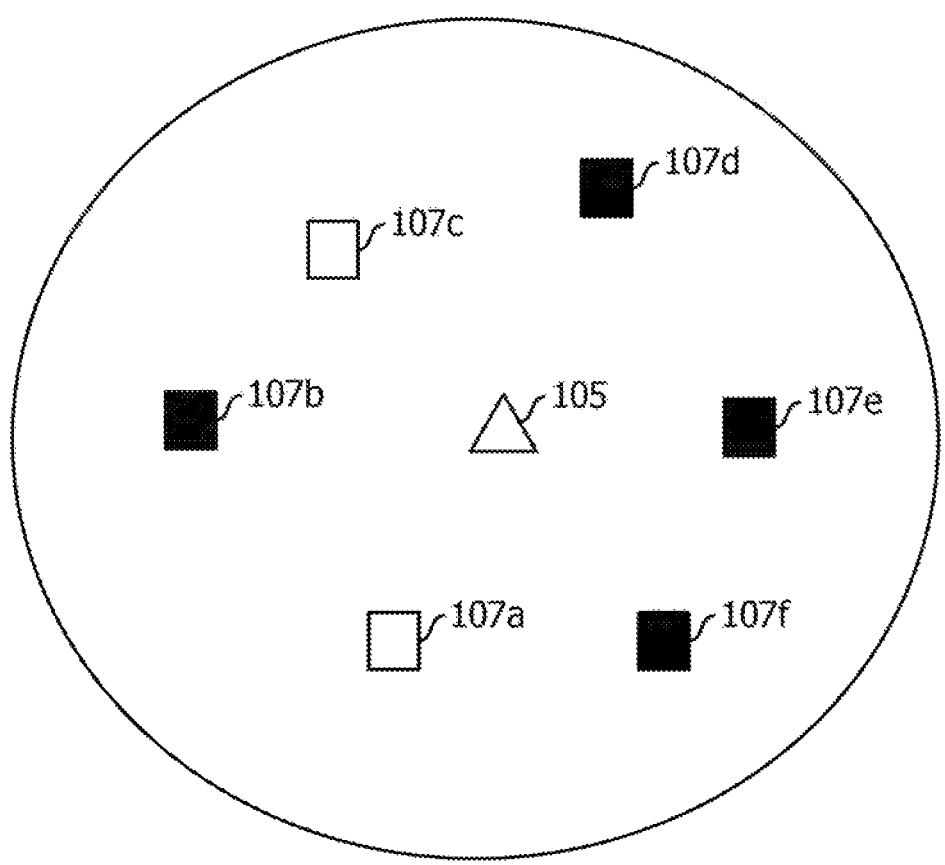
FIG. 12 is a diagram illustrating an example of the arrangement of the radio terminals.

FIG. 12 illustrates an example of the arrangement of a small number of non-destination terminals. In this example, the radio terminals 107b, 107d, 107e, and 107f correspond to destinations, while the radio terminals 107a and 107c do not correspond to the destinations. Specifically, the number of the radio terminals 107 that do not correspond to the destinations is smaller than the number of the radio terminals corresponding to the destinations. In this case, if the radio terminals 107 that do not correspond to the destinations are identified, a product of primes assigned to the radio terminals 107 that do not correspond to the destinations is smaller. In the example illustrated in FIG. 12, the radio terminals 107 that do not correspond to the destinations are identified in a reversed mode.

Figure 13:
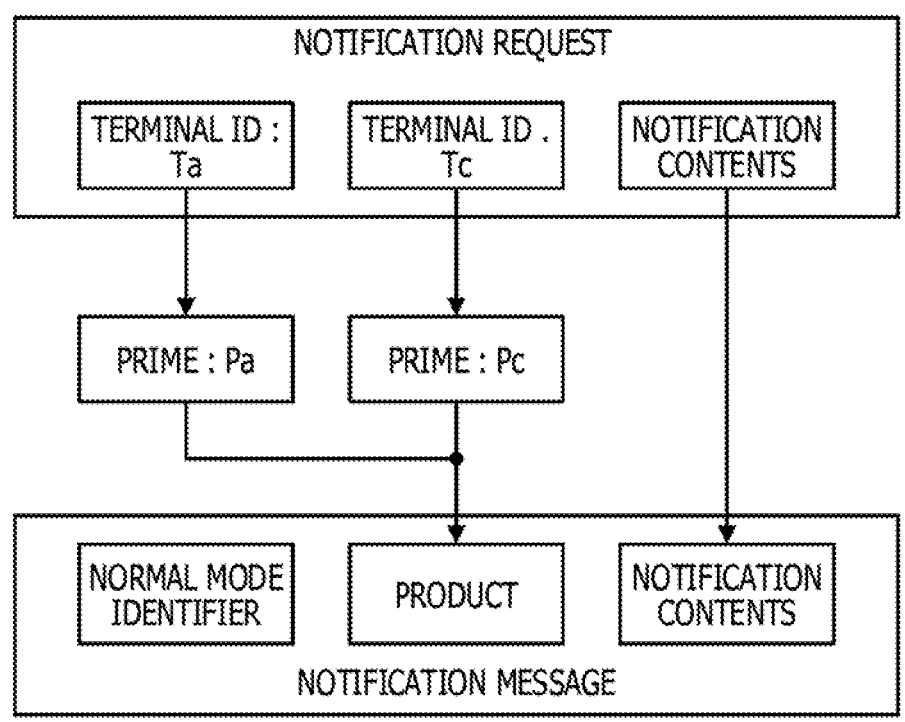
FIG. 13 is a diagram illustrating the outline of a notification message generated in a normal mode.

FIG. 13 illustrates the outline of a notification message generated in the normal mode. A normal mode identifier is set in the notification message generated in the normal mode. A product and notification contents are the same as or similar to those described in the first embodiment. Specifically, the product in the normal node is calculated by multiplying primes assigned to destination terminals.

Figure 14:
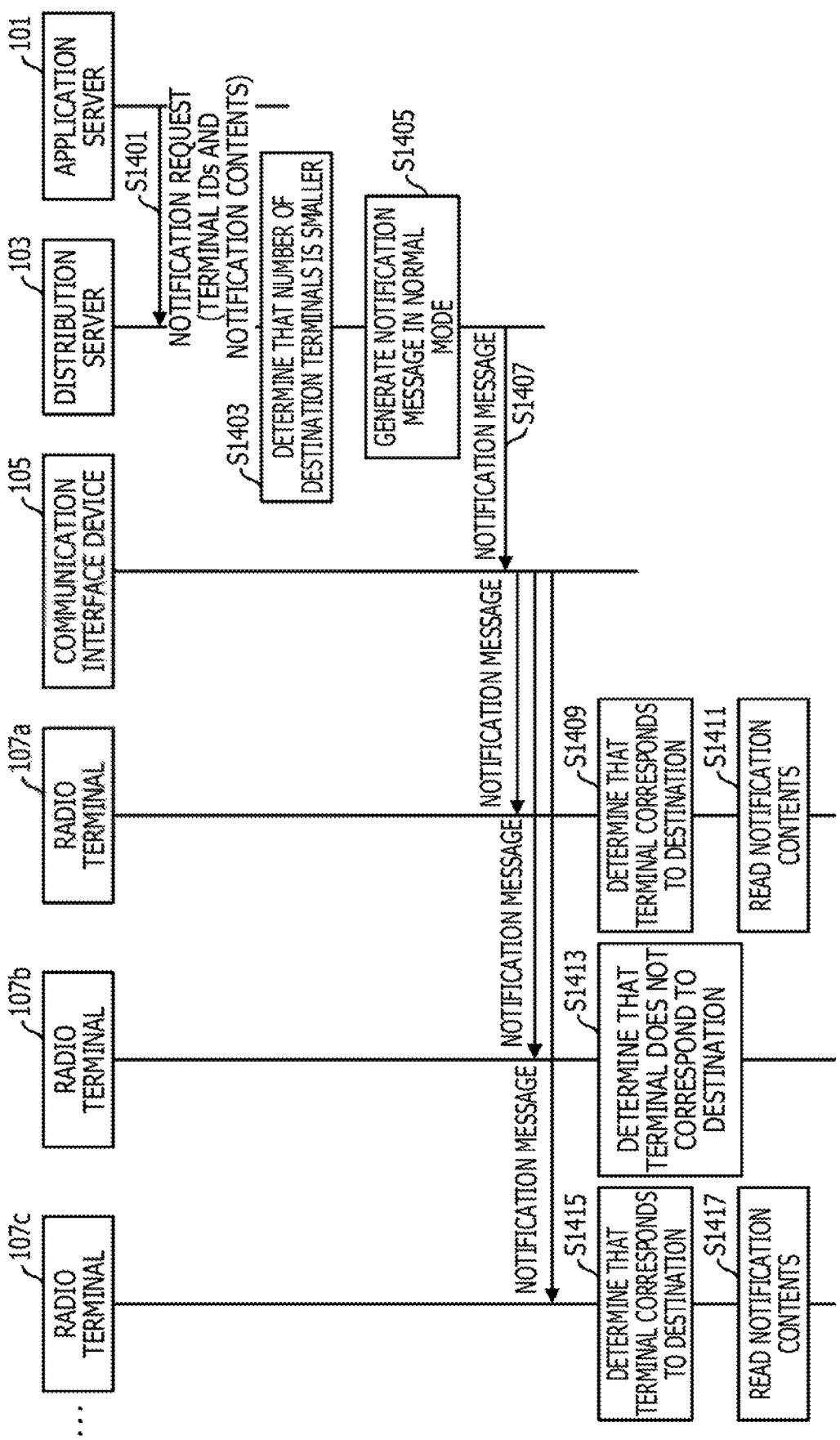
FIG. 14 is a diagram illustrating an example of a sequence in the normal mode in the distribution phase.

FIG. 14 illustrates an example of a sequence in the normal mode in the distribution phase. The application server 101 transmits a notification request to the distribution server 103 (in S1401).

When receiving the notification request, the distribution server 103 compares the number of radio terminals 107 (or destination terminals) corresponding to destinations specified in the notification request with the number of radio terminals 107 (or non-destination terminals) that do not correspond to the destinations. In this example, the distribution server 103 determines that the number of the destination terminals is smaller than the number of the non-destination terminals (in S1403).

If the distribution server 103 determines that the number of the destination terminals is smaller than the number of the non-destination terminals, processes are executed in the normal node. The distribution server 103 generates a notification message in the normal node (in S1405).

The normal mode is substantially the same as that described in the first embodiment. The distribution server 103 transmits the notification message generated in the normal mode to radio terminals 107 located in the communication range of the communication interface device 105 via the communication interface device 105 (in S1407).

The notification message generated in the normal mode is processed in the same manner as the processes of S607 to S615 illustrated in FIG. 6 (in S1409 to S1417).

Figure 15:
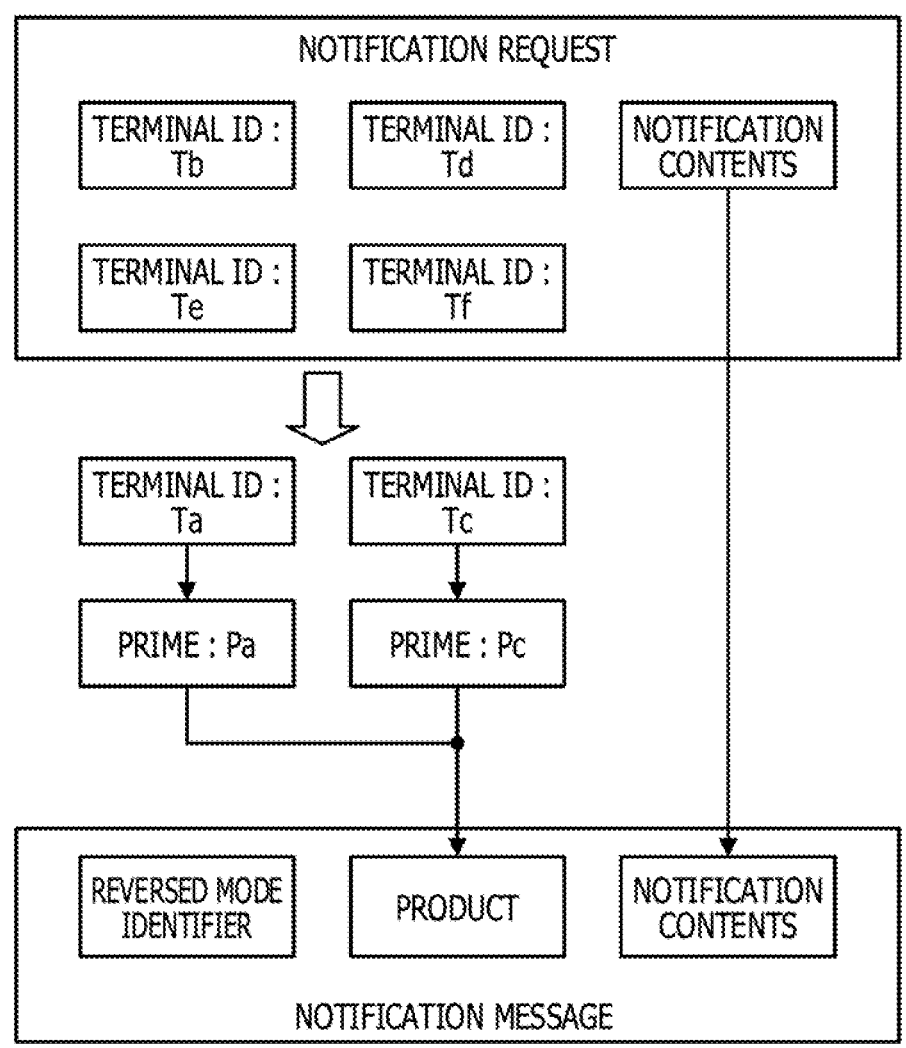
FIG. 15 is a diagram illustrating the outline of a notification message generated in a reversed mode.

FIG. 15 illustrates the outline of a notification message generated in the reversed mode. A reversed mode identifier is set in the notification message generated in the reversed mode. A product in the reversed mode is calculated by multiplying primes assigned to non-destination terminals. In this example, "Tb", "Td", "Te", and "Tf" are the IDs of the destination terminals, while "Ta" and "Tc" are the IDs of the non-destination terminals. A product of the prime "Pa" assigned to the terminal ID "Ta" and the prime "Pc" assigned to the terminal ID "Tc" is calculated.

Figure 16:
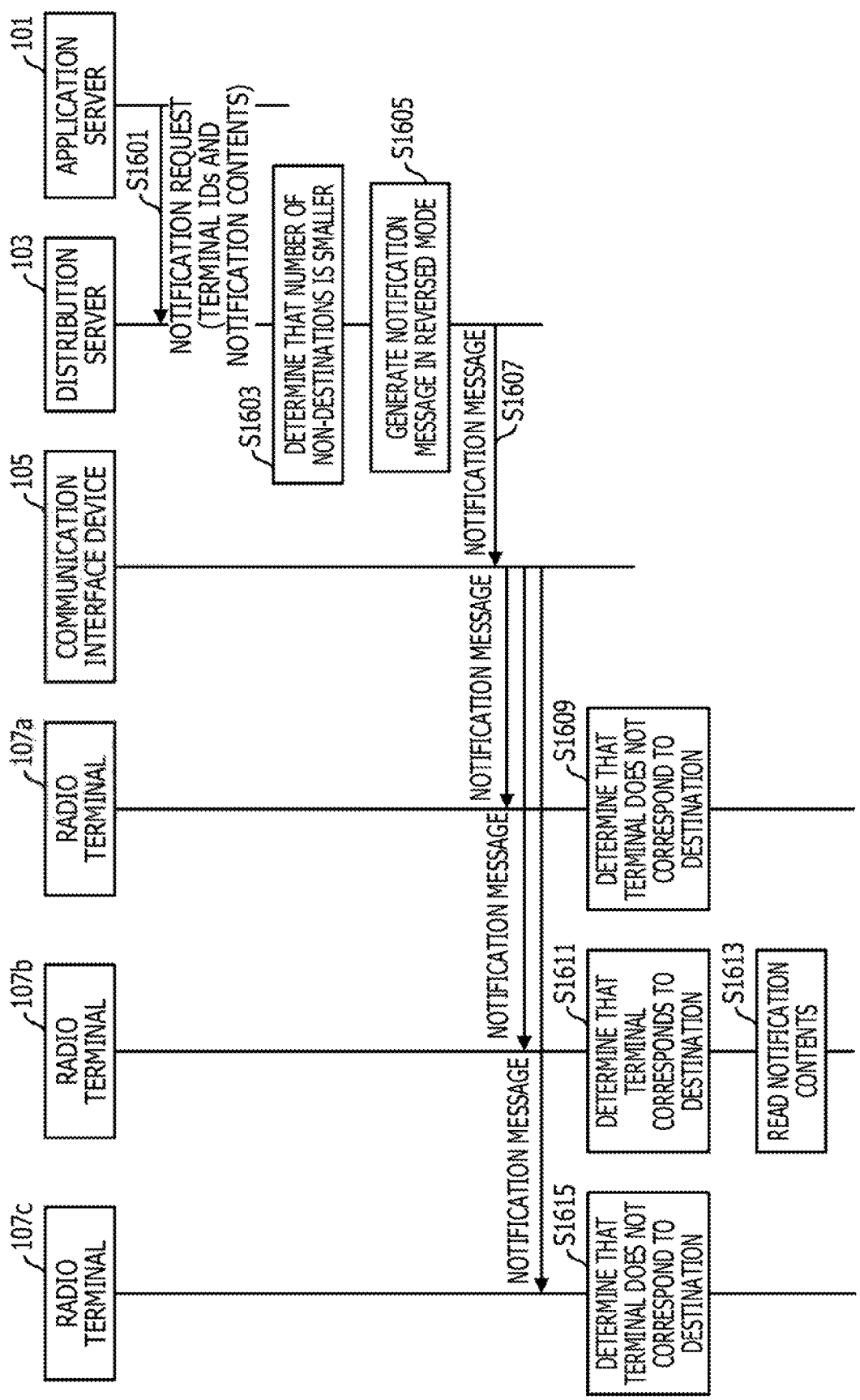
FIG. 16 is a diagram illustrating an example of a sequence in the reversed mode in the distribution phase.

FIG. 16 illustrates an example of a sequence in the reversed mode in the distribution phase. The application server 101 transmits a notification request to the distribution server 103 (in S1601).

In this example, the distribution server 103 determines that the number of non-destination terminals is smaller than the number of destination terminals (in S1603). If the distribution server 103 determines that the number of the non-destination terminals is smaller than the number of the destination terminals, processes are executed in the reversed mode. The distribution server 103 generates a notification message in the reversed mode (in S1605). A product of primes assigned to the non-destination terminals is set in the notification message generated in the reversed mode.

The distribution server 103 transmits the notification message generated in the reversed mode to radio terminals 107 located in the communication range via the communication interface device 105 (in S1607).

The product included in the notification message is divisible by the prime assigned to the radio terminal 107a. In the case where the product is divisible by the prime in the reversed mode, the radio terminal 107a determines that the radio terminal 107a does not correspond to a destination (in S1609). Thus, the radio terminal 107a does not read notification contents included in the notification message.

The product included in the notification message is not divisible by the prime assigned to the radio terminal 107b. In the case where the product is not divisible by the prime in the reversed mode, the radio terminal 107b determines that the radio terminal 107b corresponds to a destination (in S1611). Then, the radio terminal 107b reads the notification contents included in the notification message (in S1613).

The radio terminal 107c determines that the radio terminal 107c does not correspond to a destination (in S1615), like the radio terminal 107a. Thus, the radio terminal 107c does not read the notification contents included in the notification message.

The radio terminals 107d, 107e, and 107f execute the same processes as those executed by the radio terminal 107b.

Figure 17:
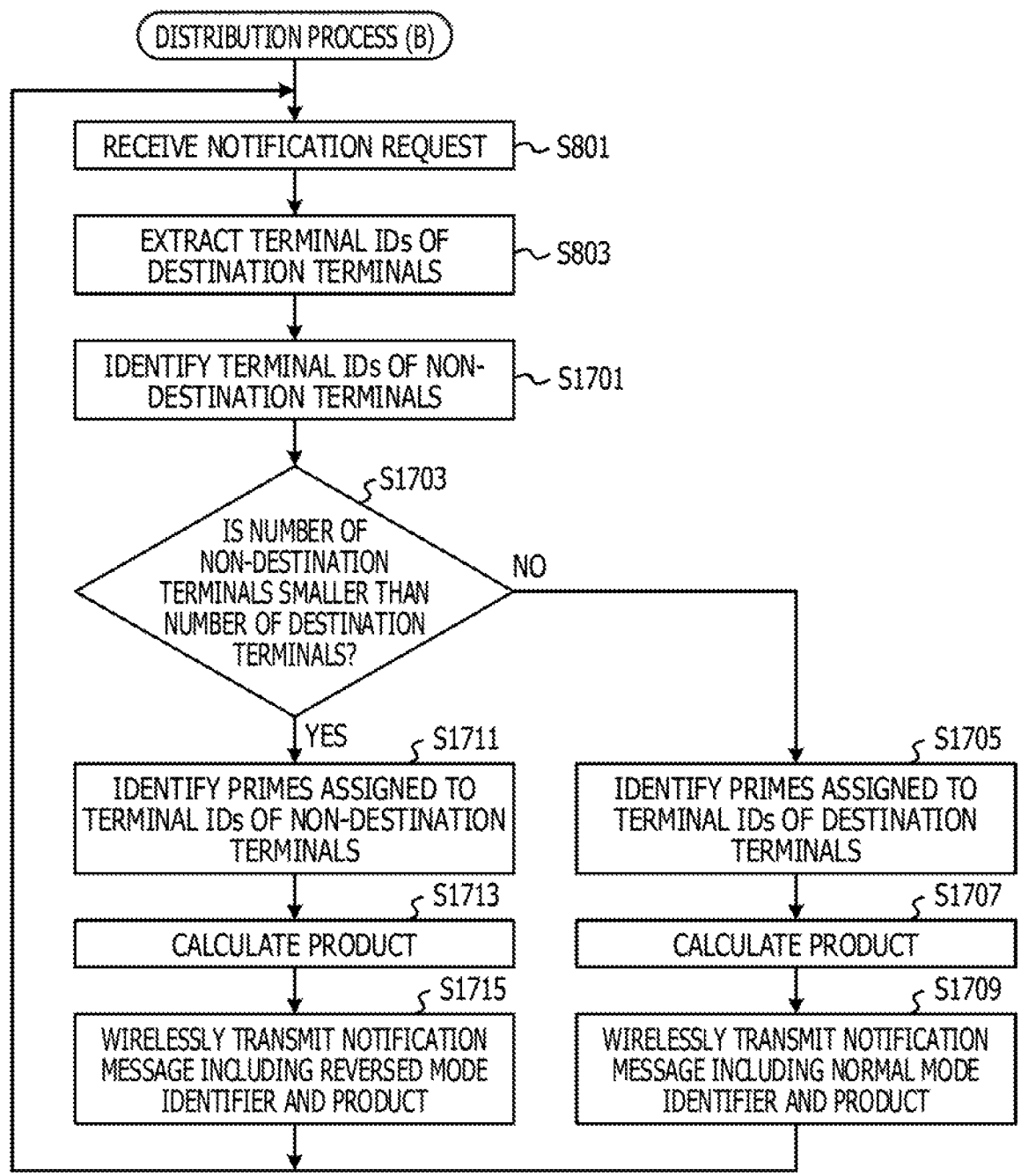
FIG. 17 is a diagram illustrating the flow of a distribution process (B)

In the second embodiment, the distribution server 103 executes a distribution process (B). FIG. 17 illustrates the flow of the distribution process (B). Processes of S801 and S803 included in the distribution process (B) are the same as or similar to those included in the distribution process (A).

The identifying section 707 identifies terminal IDs of non-destination terminals based on the terminal table (in S1701). Specifically, the terminal IDs that are set in the terminal table and are not terminal IDs of destination terminals are the terminal IDs of the non-destination terminals.

The identifying section 707 determines whether or not the number of the non-destination terminals is smaller than the number of the destination terminals (in S1703).

If the identifying section 707 determines that the number of the non-destination terminals is not smaller than the number of the destination terminals or the number of the destination terminals is smaller than the number of the non-destination terminals, the identifying section 707 identifies primes assigned to terminal IDs of the destination terminals (in S1705). The calculating section 709 calculates a product of the primes identified in S1705 (in S1707). The transmitting section 711 wirelessly transmits a notification message including the normal mode identifier and the product calculated in S1707 (in S1709). Then, the distribution process (B) returns to the process indicated by S801, and the aforementioned processes are repeated.

If the identifying section 707 determines that the number of the non-destination terminals is smaller than the number of the destination terminals, the identifying section 707 identifies primes assigned to the terminal IDs of the destination terminals (in S1711). The calculating section 709 calculates a product of the primes identified in S1711 (in S1713). The transmitting section 711 wirelessly transmits a notification message including the reversed mode identifier and the product calculated in S1713 (in S1715). Then the distribution process (B) returns to the process indicated by S801, and the aforementioned processes are repeated.

Figure 18:
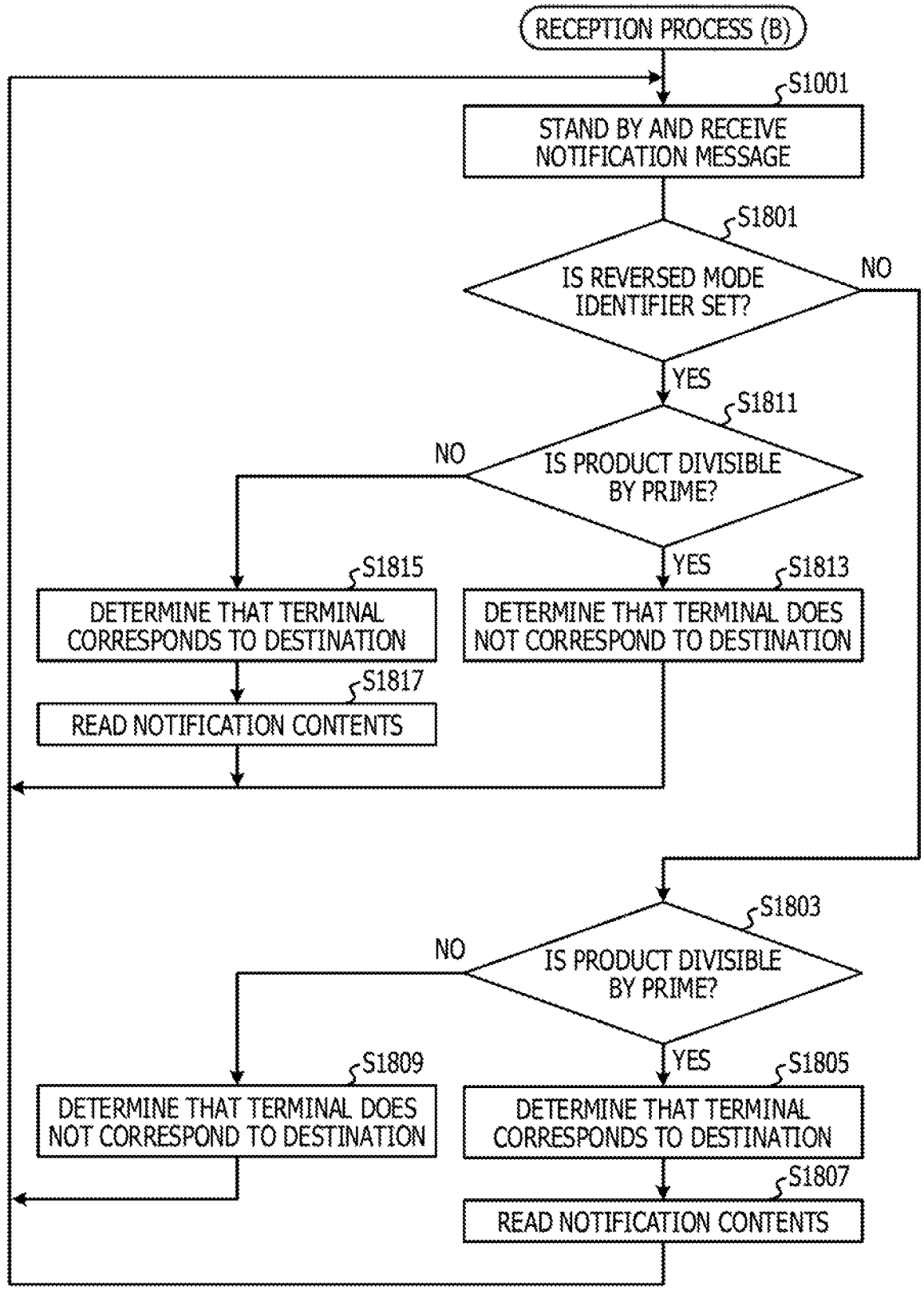
FIG. 18 is a diagram illustrating the flow of a reception process (B)

In the second embodiment, each of the radio terminals 107 executes a reception process (B). FIG. 18 illustrates the flow of the reception process (B). A process of S1001 included in the reception process (B) is the same as that included in the reception process (A).

The determining section 905 determines whether or not the reversed mode identifier is set in the received notification message (in S1801).

If the determining section 905 determines that the reversed mode identifier is not set in the notification message or the notification message has been generated in the normal mode, the determining section 905 determines whether or not the product set in the notification message is divisible by a prime assigned to the target radio terminal 107 (in S1803). If the product is divisibly by the prime, the determining section 905 determines that the target radio terminal 107 corresponds to a destination (in S1805). Then, the reading section 907 reads the notification contents included in the notification message (in S1807). After that, a process may be executed based on the notification contents. In this example, the reception process (B) returns to the process indicated by S1001, and the aforementioned processes are repeated. If the product is not divisibly by the prime, the determining section 905 determines that the target radio terminal 107 does not correspond to the destination (in S1809). Then, the reception process (B) returns to the process indicated by S1001, and the aforementioned processes are repeated.

Return to the description of the process indicated by S1801. If the determining section 905 determines that the reversed mode identifier is the notification message, the determining section 905 determines whether or not the product set in the notification message is divisible by the prime assigned to the target radio terminal 107 (in S1811). If the product is divisible by the prime, the determining section 905 determines that the target radio terminal 107 does not correspond to the destination (in S1813). Then, the reception process (B) returns to the process indicated by S1001, and the aforementioned processes are repeated. If the product is not divisible by the prime, the determining section 905 determines that the target radio terminal 107 corresponds to the destination (in S1815). Then, the reading section 907 reads the notification contents included in the notification message (in S1817). After that, a process may be executed based on the notification contents. In this example, the reception process (B) returns to the process indicated by S1001, and the aforementioned processes are repeated.

According to the second embodiment, even if a ratio of the number of destination terminals is high, the amount of data on a product of primes may be small.

Third Embodiment

In a third embodiment, if the number of radio terminals corresponding to destinations is large, the destination terminals are classified into multiple groups. Then, products of primes assigned to destination terminals belonging to the groups are calculated, and messages that include the primes are transmitted.

Figure 19:
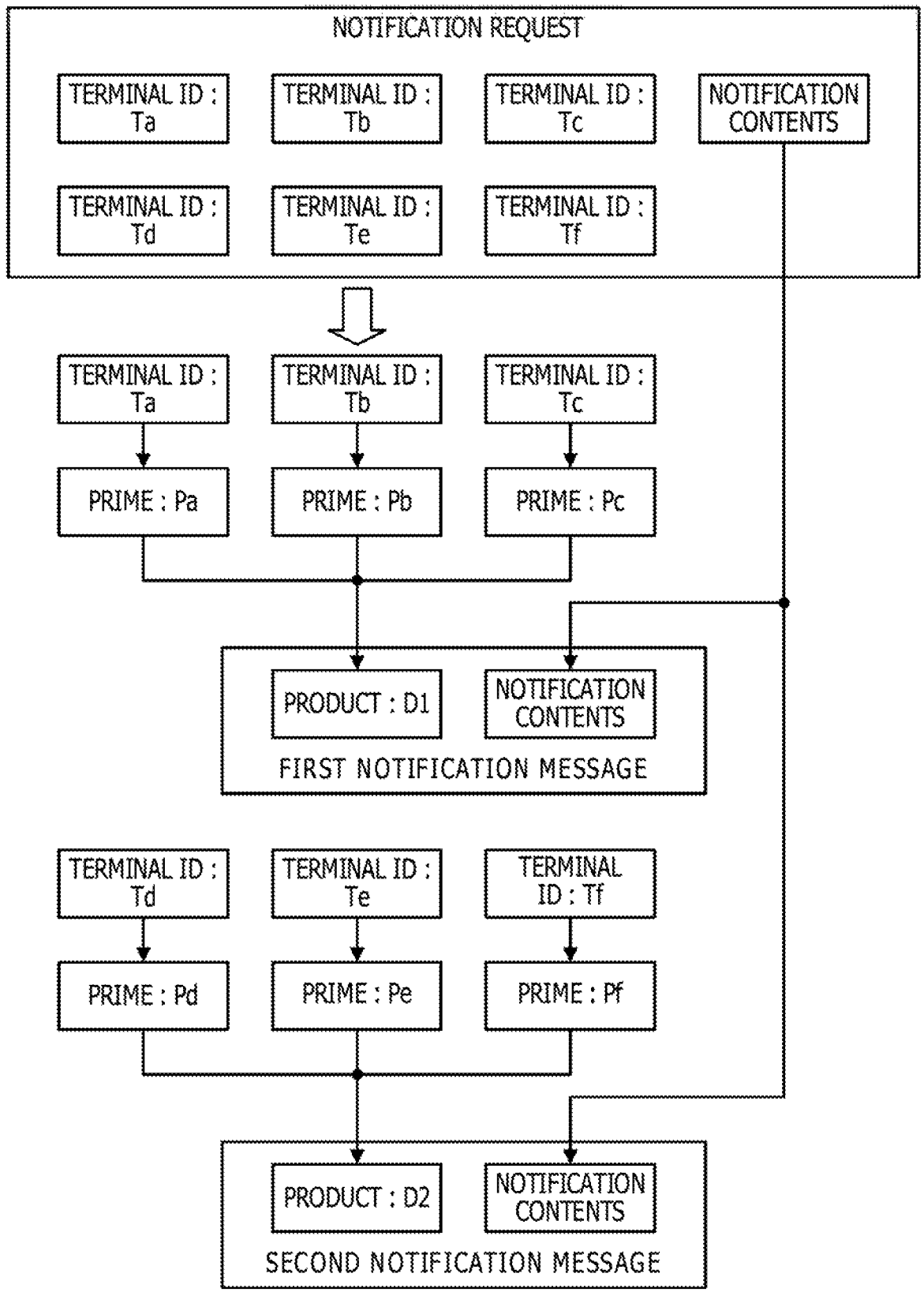
FIG. 19 is a diagram illustrating the outline of notification messages according to a third embodiment.

FIG. 19 illustrates the outline of notification messages according to the third embodiment. In an example illustrated in FIG. 19, the terminal IDs "Ta" to "Tf" that indicate destinations are set in a notification request. In this example, the terminal IDs that indicate the destinations are classified into two groups, and notification messages are generated for the two groups, respectively. Specifically, it is assumed that the terminal IDs "Ta", "Tb", and "Tc" belong to a first group and that the terminal IDs "Td", "Te" and "Tf" belong to a second group.

A product "D1" of the prime "Pa" associated with the terminal ID "Ta" included in the first group, the prime "Pb" associated with the terminal ID "Tb" included in the first group, and the prime "Pc" associated with the terminal ID "Tc" included in the first group is calculated. The product "D1" is set in a first notification message.

A product "D2" of the prime "Pd" associated with the terminal ID "Td" included in the second group, the prime "Pe" associated with the terminal ID "Te" included in the second group, and the prime "Pf" associated with the terminal ID "Tf" included in the second group is calculated. The product "D2" is set in a second notification message.

Notification contents set in the first notification message are the same as notification contents set in the second notification message.

Figure 20:
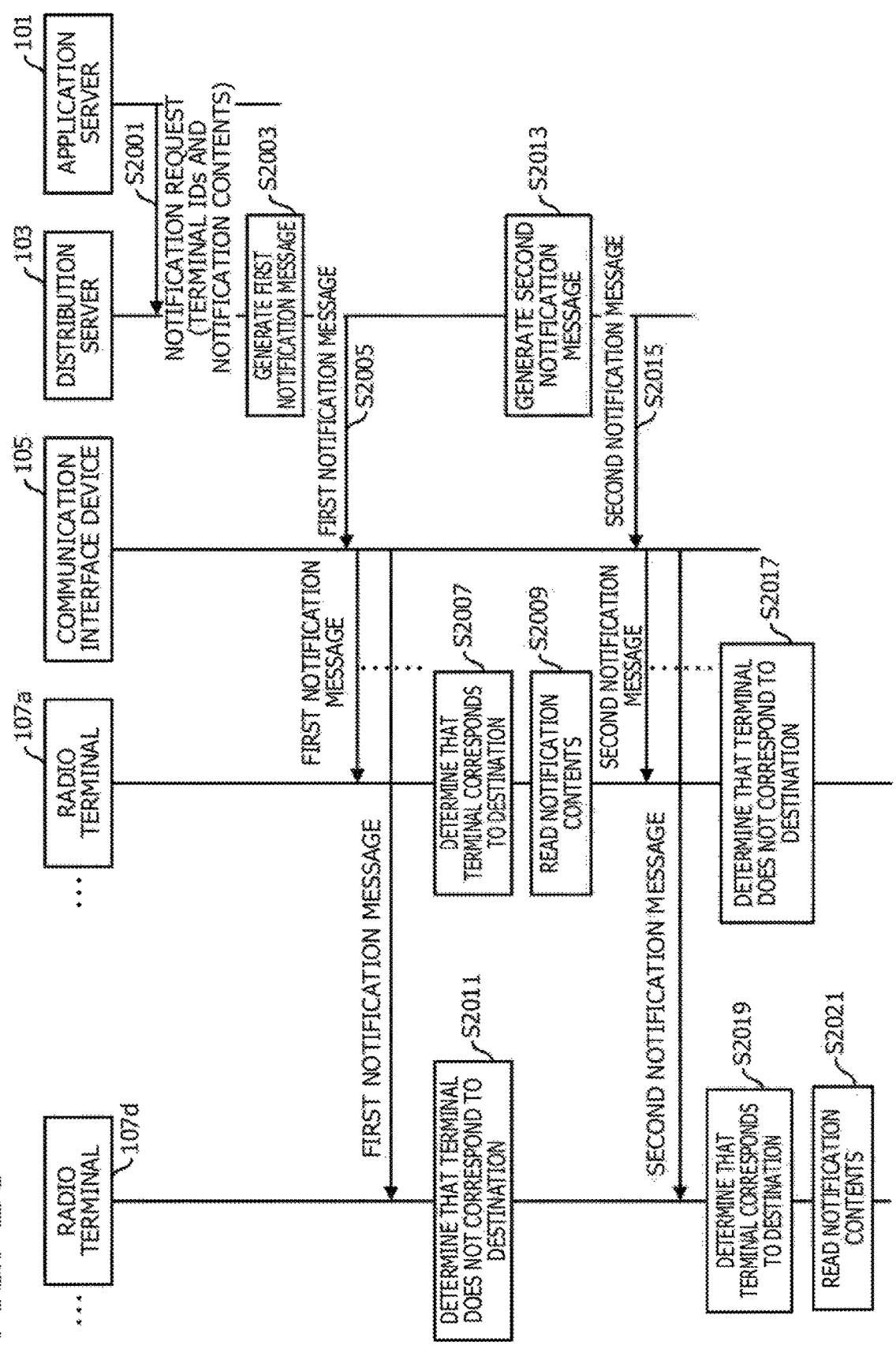
FIG. 20 is a diagram illustrating an example of a sequence in distribution phase according to the third embodiment.

FIG. 20 illustrates an example of a sequence in a distribution phase according to the third embodiment. The application server 101 transmits a notification request to the distribution server 103 (in S2001).

In this example, the distribution server 103 classifies destination terminals specified in the notification request into two groups or first and second groups in the same manner as described above.

The distribution server 103 generates a first notification message for radio terminals 107 included in the first group (in S2003). Specifically, a product of the primes assigned to the radio terminals 107a to 107c is set in the first notification message. Notification contents are set in the first notification message.

The distribution server 103 transmits the first notification message to radio terminals 107 located in the communication range via the communication interface device 105 (in S2005).

The product included in the first notification message is divisible by the prime assigned to the radio terminal 107a. Thus, the radio terminal 107a determines that the radio terminal 107a corresponds to a destination (in S2007). Then, the radio terminal 107a reads the notification contents included in the first notification message (in S2009).

The product included in the first notification message is not divisible by the prime assigned to the radio terminal 107d. Thus, the radio terminal 107d determines that the radio terminal 107d does not corresponds to a destination (in S2011). Accordingly, the radio terminal 107d does not read the notification contents included in the first notification message.

The distribution server 103 generates a second notification message for radio terminals 107 included in the second group (in S2013). Specifically, a product of the primes assigned to the radio terminals 107d to 107f is set in the second notification message. Notification contents set in the second notification message are the same as or similar to those set in the first notification message.

The distribution server 103 transmits the second notification message to the radio terminals 107 located in the communication range via the communication interface device 105 (in S2015).

The product included in the second notification message is not divisible by the prime assigned to the radio terminal 107a. Thus, the radio terminal 107a determines that the radio terminal 107a does not correspond to a destination (in S2017). Accordingly, the radio terminal 107a does not read the notification contents included in the second notification message (in S2021).

The product included in the second notification message is divisible by the prime assigned to the radio terminal 107d. Thus, the radio terminal 107d determines that the radio terminal 107d corresponds to a destination (in S2019). Then, the radio terminal 107d reads the notification contents included in the second notification message (in S2021).

The radio terminals 107b and 107c execute the same processes as those executed in the radio terminal 107a. The radio terminals 107e and 107f execute the same processes as those executed in the radio terminal 107d.

Figure 21:
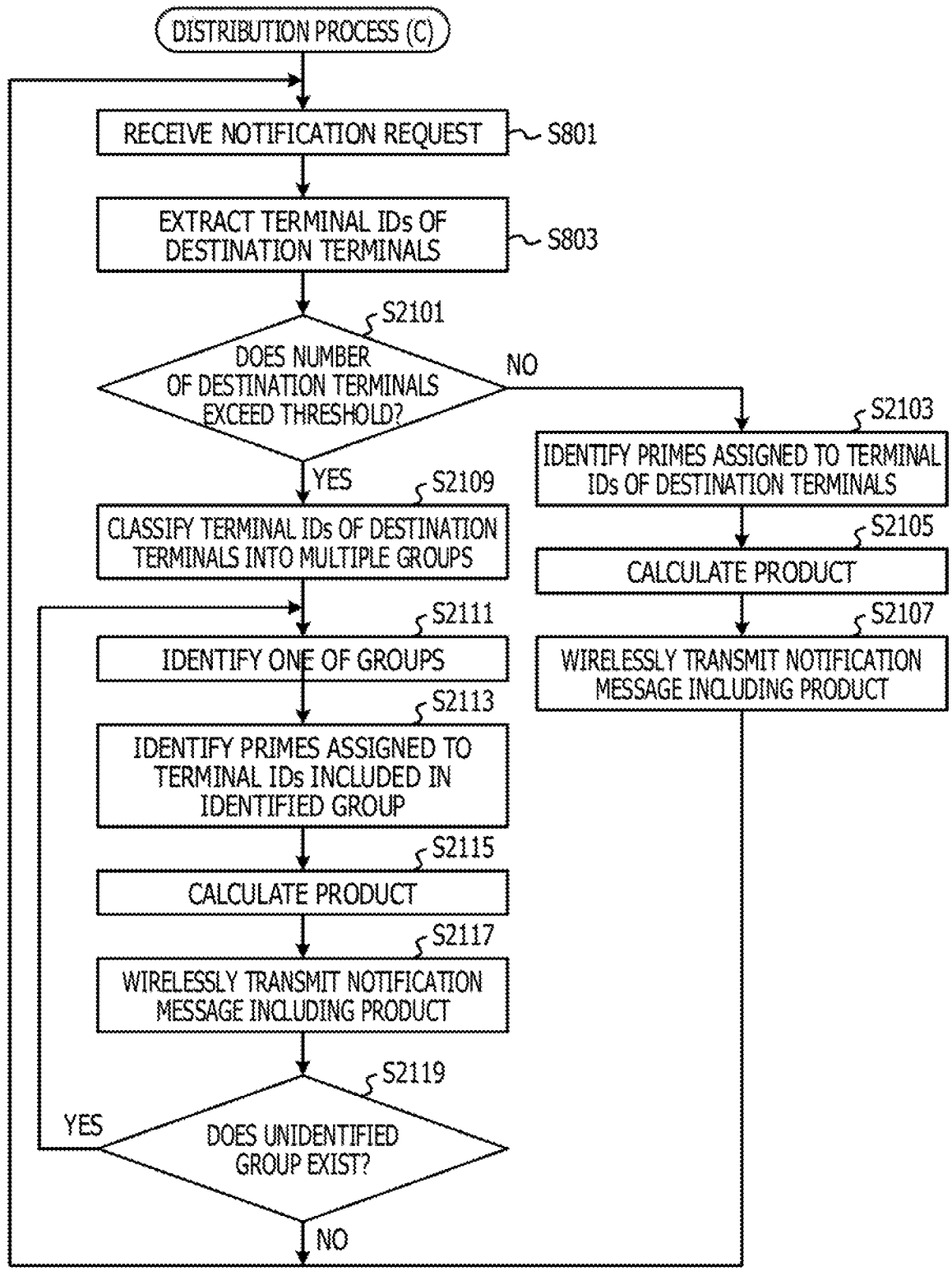
FIG. 21 is a diagram illustrating the flow of a distribution process (C)

In the third embodiment, the distribution server 103 executes a distribution process (C). FIG. 21 illustrates the flow of the distribution process (C). Processes of S801 and S803 included in the distribution process (C) are the same as or similar to those included in the distribution process (A).

The identifying section 707 determines whether or not the number of destination terminals exceeds a threshold (in S2101). The threshold corresponds to the maximum number of radio terminals included in a group.

If the identifying section 707 determines that the number of the destination terminals does not exceed the threshold, the identifying section 707 identifies primes assigned to terminal IDs of the destination terminals (in S2103). The calculating section 709 calculates a product of the primes identified in S2103 (in S2105). The transmitting section 711 wirelessly transmits a notification message including the product calculated in S2105 (in S2107). Specifically, a process that is the same as or similar to that described in the first embodiment is executed. Then, the distribution process (C) returns to the process indicated by S801, and the aforementioned processes are repeated.

Return to the description of the process indicated by S2101. If the identifying section 707 determines that the number of the destination terminals exceeds the threshold, the identifying section 707 classifies the terminal IDs of the destination terminals into multiple groups (in S2109).

The identifying section 707 identifies one of the multiple groups (in S2111). The identifying section 707 identifies primes assigned to terminal IDs included in the identified group (in S2113). The calculating section 709 calculates a product of the primes identified in S2113 (in S2115). The transmitting section 711 wirelessly transmits a notification message including the product calculated in S2115 (in S2117).

The identifying section 707 determines whether or not an unidentified group exists (in S2119). If the identifying section 707 determines that the unidentified group exists, the distribution process (C) returns to the process indicated by S2111, and the aforementioned processes are repeated. If the identifying section 707 determines that the unidentified group does not exist, the distribution process (C) returns to the process indicated by S801, and the aforementioned processes are repeated.

The radio terminals 107 execute the reception process (A) in the same manner as the first embodiment.

According to the third embodiment, even if the number of destination terminals is large, the amount of data on a product of primes may be small.

Fourth Embodiment

In a fourth embodiment, an example in which if the number of radio terminals that correspond to destinations is small, a dummy prime is further multiplied is described. If the multiplication is executed, a difficulty in factorization into prime factors is increased and the prediction of the destination terminals becomes more difficult.

Figure 22:
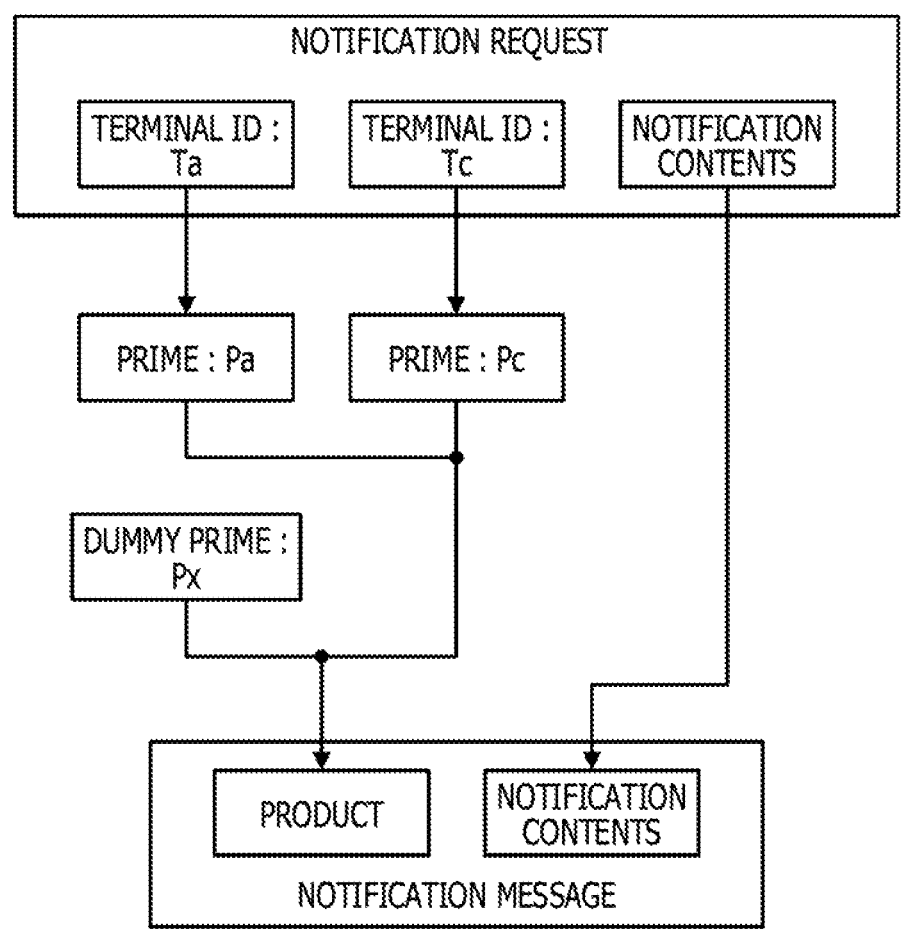
FIG. 22 is a diagram illustrating the outline of a notification message according to a fourth embodiment.

FIG. 22 illustrates the outline of a notification message according to the fourth embodiment. In an example illustrated in FIG. 22, the terminal IDs "Ta" and "Tc" that indicate destinations are set in a notification request. In this example, since "2" that is the number of the terminals IDs indicating the destinations is smaller than a threshold "3", a dummy prime "Px" is treated as a term of multiplication. Specifically, a product of the prime "Pa" associated with the terminal ID "Ta", the prime "Pc" associated with the terminal ID "Tc", and the dummy prime "Px" is calculated.

Figure 23:
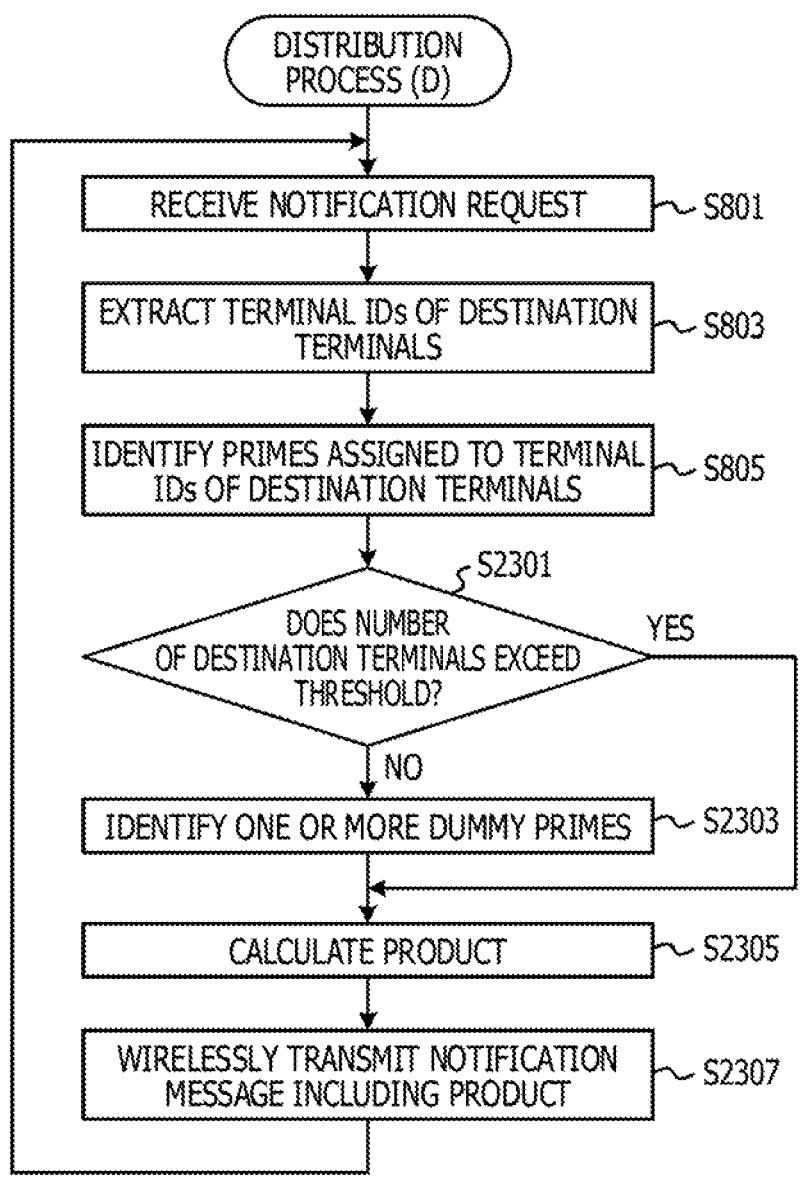
FIG. 23 is a diagram illustrating the flow of a distribution process (D)

In the fourth embodiment, the distribution server 103 executes a distribution process (D). FIG. 23 illustrates the flow of the distribution process (D). Processes of S801 to S805 included in the distribution process (D) are the same as or similar to those included in the distribution process (A).

The calculating section 709 determines whether or not the number of destination terminals exceeds a threshold (in S2301). If the calculating section 709 determines that the number of the destination terminals exceeds the threshold, the calculating section 709 calculates a product of primes identified in S805 (in S2305).

If the calculating section 709 determines that the number of the destination terminals does not exceed the threshold, the calculating section 709 identifies one or more dummy primes (in S2303). The one or more dummy primes are primes that are not assigned to the radio terminals. The number of dummy primes may be 1 or 2 or more.

The calculating section 709 calculates a product of the primes identified in S805 and the one or more dummy primes identified in S2303 (in S2305).

The transmitting section 711 wirelessly transmits a notification message including the product calculated in S2305 (in S2307). Then, the distribution process (D) returns to the process indicated by S801 and the aforementioned processes are repeated.

The radio terminals 107 execute the reception process (A) in the same manner as the first embodiment.

According to the fourth embodiment, even if the number of destination terminals is small, it is difficult to predict the destination terminals. In addition, even if the number of the destination terminals is small, it is difficult to predict the number of the destination terminals.

Fifth Embodiment

In a fifth embodiment, multiple communication interface devices 105 are used to cover a wide communication range.

Figure 24:
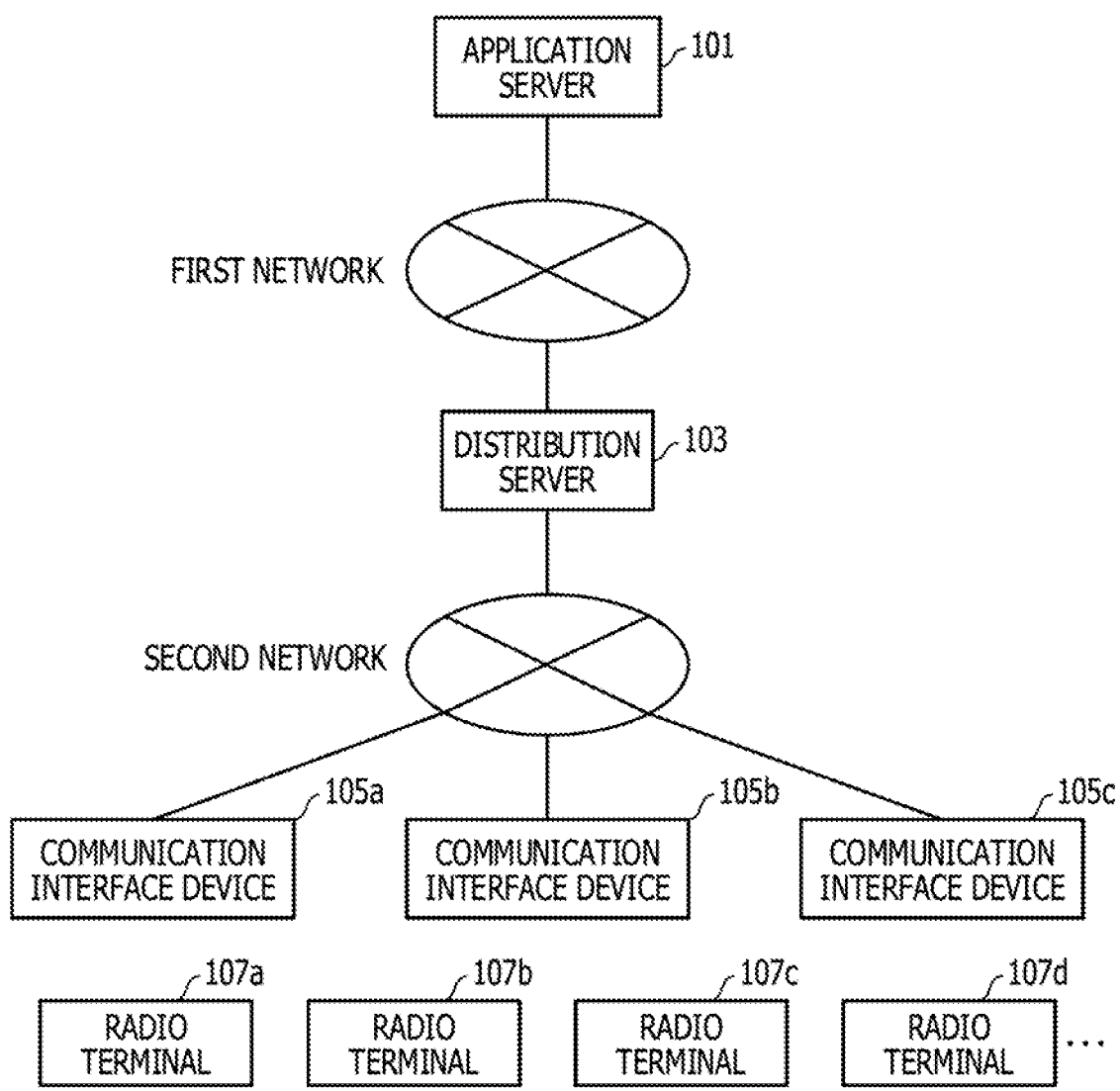
FIG. 24 is a diagram illustrating an example of a network configuration according to a fifth embodiment.

FIG. 24 illustrates an example of a network configuration according to the fifth embodiment. In this example, the distribution server 103 is connected to communication interface devices 105a to 105c via the second network. If a venue is large or is divided into multiple spaces, the communication range may be increased by the multiple communication interface devices 105 in this manner.

A radio terminal 107 searches a communication interface device 105 for communication among the multiple communication interface devices 105 by receiving signals repeatedly transmitted from the communication interface devices 105a to 105c. Then, the radio terminal 107 receives a notification message from the searched communication interface device 105.

FIG. 25 illustrates an example of the configuration of a terminal table according to the fifth embodiment. Terminal records included in the terminal table according to the fifth embodiment further include fields in which interface IDs are set. The interface IDs identify communication interface devices 105 located where the communication interface devices 105 wirelessly communicate with terminals identified in the terminal records.

The example indicates that the communication interface device 105a identified by an ID "F1" wirelessly communicates with the radio terminal 107a identified by the ID "Ta" and the radio terminal 107b identified by the ID "Tb". In addition, the example indicates that the communication interface device 105b identified by an ID "F2" wirelessly communicates with the radio terminal 107c identified by the ID "Tc" and the radio terminal 107d identified by the ID "Td".

If communication ranges of radio terminals 107 do not duplicate each other, and a communication interface device 105 from which any of the radio terminals 107 receives a signal is different from a communication interface device 105 from which the other radio terminal 107 receives a signal, primes assigned to the radio terminals 107 may duplicate each other.

Figure 26:
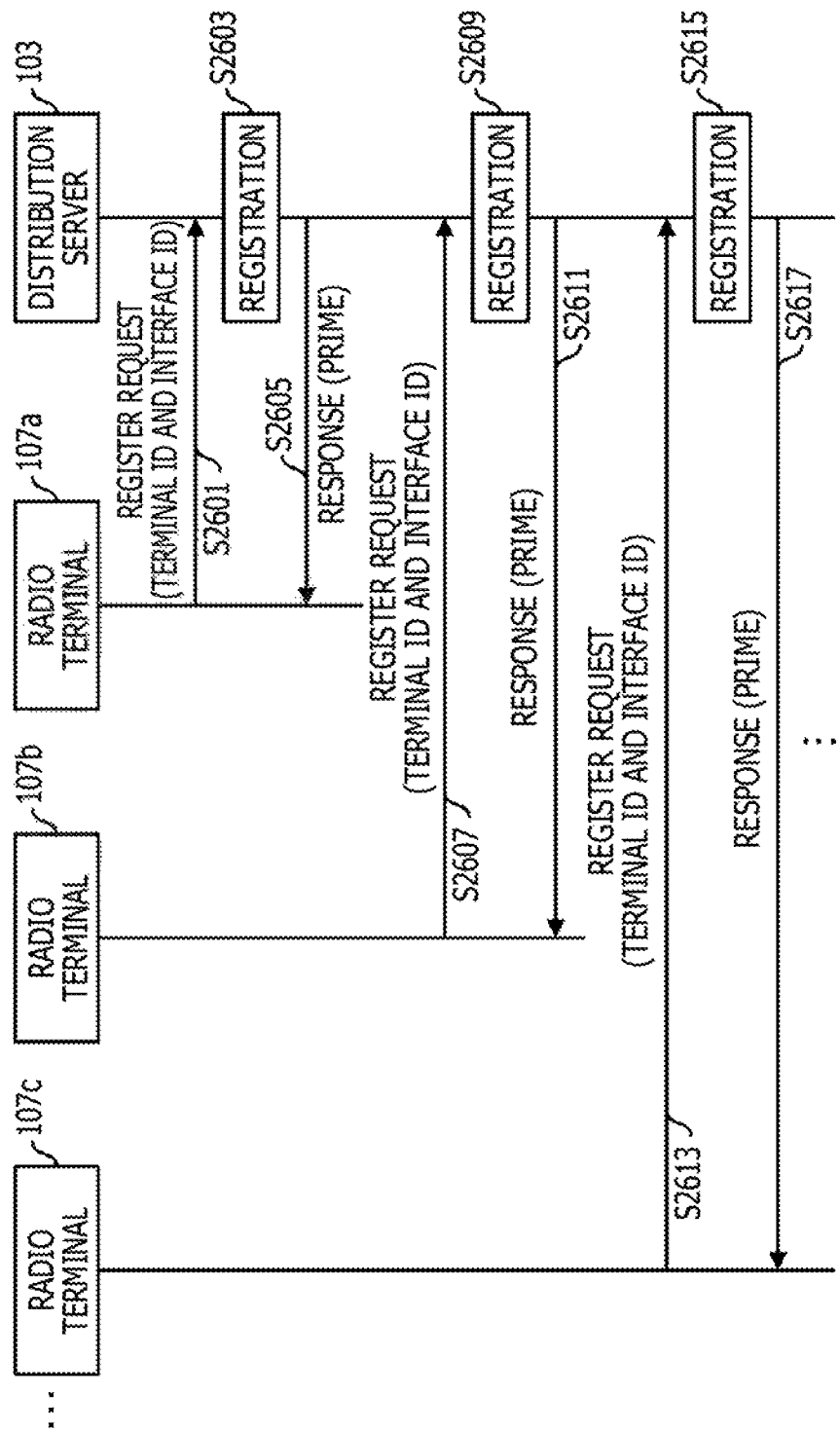
FIG. 26 is a diagram illustrating an example of a sequence in a registration phase according to the fifth embodiment.

FIG. 26 illustrates an example of a sequence in a registration phase in the fifth embodiment. The radio terminal 107a transmits, to the distribution server 103, a register request including an interface ID identifying the searched communication interface device 105a (in S2601).

The distribution server 103 registers the interface ID and the prime assigned to the radio terminal 107a (in S2603). The distribution server 103 returns, to the radio terminal 107a, a response including the prime assigned to the radio terminal 107a (in S2605).

Similarly, the radio terminal 1071) transmits, to the distribution server 103, a register request including the interface ID identifying the searched communication interface device 105a (in S2607).

The distribution server 103 registers the interface ID and the prime assigned to the radio terminal 107b (in S2609). The distribution server 103 returns, to the radio terminal 107b, a response including the prime assigned to the radio terminal 107b (in S2611).

Similarly, the radio terminal 107c transmits, to the distribution server 103, a register request including an interface ID identifying the searched communication interface device 105b (in S2613).

The distribution server 103 registers the interface ID and the prime assigned to the radio terminal 107c (in S2615). The distribution server 103 returns, to the radio terminal 107c, a response including the prime assigned to the radio terminal 107c (in S2617). A description of the radio terminals 107d to 107f is omitted.

Figure 27:
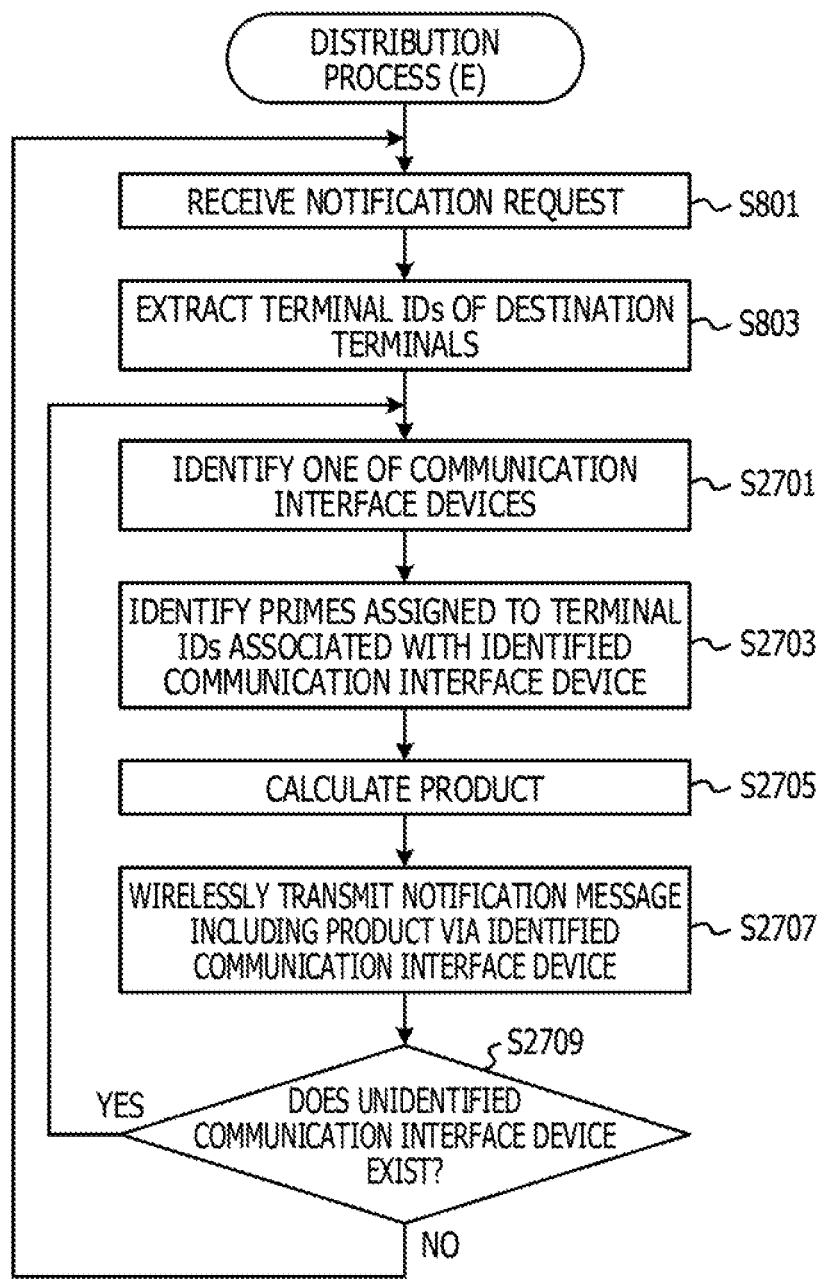
FIG. 27 is a diagram illustrating the flow of a distribution process (E)

In the fifth embodiment, the distribution server 103 executes a distribution process (E). FIG. 27 illustrates the flow of the distribution process (E). Processes of S801 and S803 included in the distribution process (E) are the same as or similar to those included in the distribution process (A).

The identifying section 707 identifies one of the communication interface devices (in S2701). The identifying section 707 identifies primes assigned to terminal IDs associated with the identified communication interface device (in S2703). The calculating section 709 calculates a product of the primes identified in S2703 (in S2705). The transmitting section 711 wirelessly transmits a notification message including the product calculated in S2705 via the identified communication interface device (in S2707).

The identifying section 707 determines whether or not an unidentified communication interface device exists (in S2709). If the identifying section 707 determines that the unidentified communication interface device exists, the distribution process (E) returns to the process indicated by S2701, and the aforementioned processes are repeated. If the identifying section 707 determines that the unidentified communication interface device does not exist, the distribution process (E) returns to the process indicated by S801, and the aforementioned processes are repeated.

The radio terminals 107 execute the reception process (A) in the same manner as the first embodiment.

According to the fifth embodiment, even when the wide communication range is covered, the amount of data on a product may be small.

FIG. 28 illustrates an example of a hardware configuration of each of the radio terminals 107. Each of the radio terminals 107 includes a central processing unit (CPU) 2801, a storage circuit 2803, a first radio communication antenna 2811, first radio communication control circuit 2813, a second radio communication antenna 2815, a second radio communication control circuit 2817, a third radio communication antenna 2819, a third radio communication control circuit 2821, a liquid crystal display (LCD) control circuit 2823, a LCD 2825, a touch sensor 2827, and a key group 2829, for example.

The CPU 2801 executes a program stored in the storage circuit 2803. The storage circuit 2803 includes a read only memory (ROM) 2805, a random access memory (RAM) 2807, and a flash memory 2809, for example. The ROM 2805 stores a basic program and initial data, for example. The RAM 2807 includes a region in which a program is loaded. The RAM 2807 further includes a region for temporarily storing data. The flash memory 2809 stores a program such as an application and user data, for example.

The first radio communication antenna 2811 receives a radio wave based on the cellular scheme. The first radio communication control circuit 2813 controls radio communication by the cellular scheme. The second radio communication antenna 2815 receives a radio wave based on the wireless LAN scheme. The second radio communication control circuit 2817 controls radio communication by the wireless LAN scheme. The third radio communication antenna 2819 receives a radio wave from a communication interface device 105 by the near-field communication scheme. The third radio communication control circuit 2821 controls radio communication by the near-field communication scheme.

The LCD control circuit 2823 drives the LCD 2825. The LCD 2825 displays various screens. The touch sensor 2827 is a panel sensor arranged on a display screen of the LCD 2825 and receives an instruction by a touch operation, for example. Specifically, the LCD 2825 and the touch sensor 2827 are formed in an integrated manner and used as a touch panel. Hard keys of the key group 2829 are arranged at a portion of a housing.

Although the embodiments are described above, the present disclosure is not limited to the embodiments. For example, the aforementioned functional block configurations may not match the program module configurations.

The configurations of the aforementioned storage regions are an example, and the storage regions are not limited to the aforementioned configurations. In addition, in the process flows, the orders of the processes may be changed and multiple processes among the processes may be executed in parallel as long as the results of the processes do not change.

The aforementioned distribution server 103 is a computer device. As illustrated in FIG. 29, in the distribution server 103, a memory 2501, a central processing unit (CPU) 2503, a hard disk drive (HDD) 2505, a display controller 2507 connected to a display device 2509, a driving device 2513 for a removable disk 2511, an input device 2515, and a communication controller 2517 to be connected to a network are connected to each other via a bus 2519. An operating system (OS) and an application program for executing the processes described in the embodiments are stored in the HDD 2505. In order for the CPU 2503 to execute the OS and the application program, the CPU 2503 reads the OS and the application program from the HDD 2505 into the memory 2501. The CPU 2503 controls the display controller 2507, the communication controller 2517, and the driving device 2513 based on details of a process of the application program and causes the display controller 2507, the communication controller 2517, and the driving device 2513 to execute predetermined operations. Data that is being processed is stored in the memory 2501, but may be stored in the HDD 2505. In the embodiments, the application program for executing the aforementioned processes is stored in the computer-readable removable disk 2511, distributed, and installed in the HDD 2505 from the driving device 2513. The application program is installed in the HDD 2505 via a network such as the Internet and the communication controller 2517 in some cases. The computer device causes the hardware such as the CPU 2503 and the memory 2501 and the programs such as the OS and the application program to closely collaborate with each other and thereby achieves the aforementioned various functions.

The aforementioned embodiments are summarized as follows.

A communication system according to each of the embodiments includes a communication processing device and terminals. The communication processing device includes (A) a storage section storing primes assigned to the multiple terminals, (B) a calculating section that calculates a first product of primes assigned to two or more destination terminals among the multiple terminals, and (C) a transmitting section that broadcasts first notification data including the first product. In addition, each of the target terminals includes (D) a receiving section that receives the first notification data and (E) a determining section that determines that the target terminal corresponds to a destination of the first notification data if the first product included in the received first notification data is divisible by a prime assigned to the target terminal.

In this case, it is difficult to predict the destinations of the mass notification by the broadcasting scheme, and it is difficult to predict the number of the destinations.

In addition, if the number of non-destination terminals that are among the multiple terminals and are not the two or more destination terminals smaller than the number of the two or more destination terminals, the calculating section may calculate a second product of primes assigned to the non-destination terminals, and the transmitting section may broadcast second notification data including the second product and the reversed mode identifier set in the second notification data. If the reversed mode identifier is set in the received second notification data, and the second product included in the second notification data is not divisible by the prime assigned to the target terminal, the determining section may determine that the target terminal corresponds to a destination of the second notification data.

In this case, even if a ratio of the number of the destination terminals is high, the amount of data on the product may be small.

In addition, if the number of the two or more destination terminals exceeds the threshold, the calculating section may calculate a third product of primes assigned to destination terminals included in each of groups into which the two or more destination terminals are classified, and the transmitting section may broadcast third notification data items including the third products. If a third product included in any of the received third notification data items is divisible by the prime assigned to the target terminal, the determining section may determine that the target terminal corresponds to a destination of the third notification data item.

In this case, even if the number of the destination terminals is large, the amount of data on the products may be small.

In addition, if the number of the two or more destination terminals is lower than the threshold, the calculating section may calculate a fourth product of the primes assigned to the two or more destination terminals and one or more primes that are not assigned to any of the multiple terminals, and the transmitting section may broadcast fourth notification data including the fourth product. If the fourth product included in the received fourth notification data is divisible by the prime assigned to the target terminal, the determining section may determine that the target terminal corresponds to a destination of the fourth notification data.

In this case, even if the number of the destination terminals is small, it is difficult to predict the destinations. In addition, even if the number of the destination terminals is small, it is difficult to predict the number of the destinations.

In addition, the communication processing device may be connected to a plurality of communication interface devices, and the storage section may store identifiers of the communication interface devices for transmitting data to the multiple terminals. The calculating section may calculate, for each of the communication interface devices, a fifth product of primes assigned to destination terminals that are among the two or more destination terminals and are associated with the identifier of the communication interface device, and the transmitting section may broadcast, via each of the communication interface devices, fifth notification data including a fifth product calculated for the communication interface device. If a fifth product included in fifth notification data received by the target terminal is divisible by the prime assigned to the target terminal, the determining section may determine that the target terminal corresponds to a destination of the fifth notification data.

In this case, even if the communication range is wide and covered, the amount of data on the products may be small.

A program for causing a computer to execute the processes that are executed by the aforementioned communication processing device may be generated. In addition, a program for causing a processor to execute the processes that are executed by the aforementioned terminals may be generated. These programs may be stored in a storage device or a computer-readable storage medium such as a flexible disk, a CD-ROM, a magneto-optical disc, a semiconductor memory, or a hard disk, for example. Intermediate results of the processes are temporarily stored in the storage device such as a main memory in general.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system comprising:
a server including first circuitry; and
a plurality of terminals, each of which includes second circuitry respectively,
wherein the first circuitry is configured to:
store primes assigned to the plurality of terminals;
acquire two or more primes, from among the primes, that are assigned to two or more first terminals that are among the plurality of terminals and are destinations of contents;
calculate a first product of the two or more primes assigned to the first terminals; and
transmit first notification data, including the first product and the contents, to the plurality of terminals, wherein the first product is used as an identifier of destination of the first notification data, the identifier is unpredictable by a second terminal in the plurality of terminals, and the second terminal being different than each of the first terminals, and
wherein the second circuitry is configured to:
store an assigned prime;
receive the first notification data;
determine whether or not the first product included in the first notification data is divisible by the assigned prime;
determine, at the second terminal when the first product included in the first notification data is not divisible by the assigned prime, that the second terminal is not the destination of the contents of the first notification data; and
acquire, at the first terminals, from the first notification data, the contents included in the first notification data, when the first product included in the first notification data is divisible by the assigned prime.

2. The system according to claim 1, wherein the first notification data is transmitted to a large unspecified number of terminals including the plurality of terminals at once without designating address.

3. The system according to claim 1, wherein the first circuitry is configured to:
set a first mode identifier in the first notification data when a first number of other terminals, from among the plurality of terminals, that are not the destinations of the contents is equal to or larger than a second number of the first terminals that are the destinations of the contents, and
transmit the first notification data including the first product, the first mode identifier, and the contents, and the first mode identifier designates how to handle the result of the determination.

4. The system according to claim 3, wherein the first circuitry is configured to:
calculate a second product of primes assigned to the other terminals when the first number is smaller than the second number, and
transmit, to the plurality of terminals, second notification data including the second product, the contents, and a second mode identifier that is different from the first mode identifier.

5. The system according to claim 4, wherein the second circuitry is configured to acquire the first mode identifier from the first notification data, or the second mode identifier from the second notification data.

6. The system according to claim 5, wherein the second circuitry is configured to:

determine whether or not the first product included in the first notification data is divisible by the assigned prime when the first mode identifier is set in the first notification data, and acquire, from the first notification data, the contents included in the first notification data when the first product is divisibly by the assigned prime.

7. The system according to claim 5, wherein the second circuitry is configured to:
determine whether or not the second product included in the second notification data is divisible by the assigned prime when the second mode identifier is set in the second notification data, and acquire, from the second notification data, the contents included in the second notification data when the second product is not divisible by the assigned prime.

8. The system according to claim 1, wherein the first circuitry is configured to:
classify the two or more terminals into a plurality of groups when a number of the first terminals exceeds a threshold, calculate a third product of primes assigned to terminals included in each of the plurality of groups, and transmit third notification data including the third products and the contents to the plurality of terminals.

9. The system according to claim 8, wherein the second circuitry is configured to:
receive the third notification data, and acquire, when a third product included in the third notification data is divisible by the assigned prime, the contents included in the third notification data.

10. A non-transitory computer-readable storage medium storing a program that causes circuitry to execute a process, the process comprising:
storing primes assigned to a plurality of terminals;

acquiring two or more primes, from among the primes, that are assigned to two or more first terminals that are among the plurality of terminals and are destinations of contents;

calculating a first product of the two or more primes assigned to the first terminals; and transmitting first notification data, including the first product and the contents, to the plurality of terminals, wherein the first product is used as an identifier of destination of the first notification data, the identifier is unpredictable by a second terminal in the plurality of terminals, and the second terminal being different than each of the first terminals.

11. The non-transitory computer-readable storage medium according to claim 10, wherein the first notification data is transmitted to a large unspecified number of terminals including the plurality of terminals at once without designating address.

12. The non-transitory computer-readable storage medium according to claim 10, the process further comprising:
setting a first mode identifier in the first notification data when a first number of other terminals, from among the plurality of terminals, that are not the destinations of the contents is equal to or larger than a second number of the first terminals that are the destinations of the contents, and transmitting the first notification data including the first product, the first mode identifier, and the contents, wherein the first mode identifier designates how to handle the result of the determination.

13. The non-transitory computer-readable storage medium according to claim 12, the process further comprising:
calculating a second product of primes assigned to the other terminals when the first number is smaller than the second number; and transmitting, to the plurality of terminals, second notification data including the second product, the contents, and a second mode identifier that is different from the first mode identifier.

14. The non-transitory computer-readable storage medium according to claim 13, the process further comprising:
acquiring the first mode identifier from the first notification data, or the second mode identifier from the second notification data.

15. The non-transitory computer-readable storage medium according to claim 14, the process further comprising:
determining whether or not the first product included in the first notification data is divisible by the assigned prime when the first mode identifier is set in the first notification data; and acquiring, from the first notification data, the contents included in the first notification data when the first product is divisibly by the assigned prime.

16. The non-transitory computer-readable storage medium according to claim 14, the process further comprising:
determining whether or not the second product included in the second notification data is divisible by the assigned prime when the second mode identifier is set in the second notification data; and acquiring, from the second notification data, the contents included in the second notification data when the second product is not divisible by the assigned prime.

17. The non-transitory computer-readable storage medium according to claim 10, the process further comprising:
classifying the two or more terminals into a plurality of groups when a number of the first terminals exceeds a threshold;

calculating a third product of primes assigned to terminals included in each of the plurality of groups; and transmitting third notification data including the third products and the contents to the plurality of terminals.

18. The non-transitory computer-readable storage medium according to claim 17, the process further comprising:
receiving the third notification data, and acquiring, when a third product included in the third notification data is divisible by the assigned prime, the contents included in the third notification data.

19. The non-transitory computer-readable storage medium according to claim 10, the process further comprising:
storing an assigned prime, at each of the plurality of terminals;

receiving the first notification data, at each of the plurality of terminals;

determining whether or not the first product included in the first notification data is divisible by the assigned prime, at each of the plurality of terminals;

determining, at the second terminal, when the first product included in the first notification data is not divisible by the assigned prime, that the second terminal is not the destination of the contents of the first notification data; and acquiring, at the first terminals, from the first notification data, the contents included in the first notification data, when the first product included in the first notification data is divisible by the assigned prime.

20. A method comprising:

storing primes assigned to a plurality of terminals, by a server;

acquiring two or more primes, from among primes, that are assigned to two or more first terminals that are among the plurality of terminals and are destinations of contents, by the server;

calculating a first product of the two or more primes assigned to the first terminals, by the server;

transmitting first notification data, including the first product and the contents, to the plurality of terminals, wherein the first product is used as an identifier of destination of the first notification data, the identifier is unpredictable by a second terminal in the plurality of terminals, and the second terminal being different than each of the first terminals, by the server;

receiving the first notification data, by the plurality of terminals, respectively;

determining whether or not the first product included in the first notification data is divisible by assigned prime, by the plurality of terminals, respectively;

determining, when the first product included in the first notification data is not divisible by the assigned prime, that the second terminal is not the destination of the contents of the first notification data, by the second terminal; and acquiring, from the first notification data, the contents included in the first notification data, when the first product included in the first notification data is divisible by the assigned prime, by the first terminals, respectively.

* * * * *